(12) United States Patent
Nakanishi

(10) Patent No.: US 7,847,900 B2
(45) Date of Patent: Dec. 7, 2010

(54) LIQUID CRYSTAL DISPLAY DEVICE'S SUBSTRATE, LIQUID CRYSTAL DISPLAY DEVICE INCLUDING THE SAME, AND MANUFACTURING METHOD OF THE SAME

(75) Inventor: Yohei Nakanishi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 489 days.

(21) Appl. No.: 11/978,460

(22) Filed: Oct. 29, 2007

(65) Prior Publication Data

US 2008/0062368 A1    Mar. 13, 2008

Related U.S. Application Data

(62) Division of application No. 11/099,403, filed on Apr. 5, 2005, now Pat. No. 7,345,719, which is a division of application No. 10/368,870, filed on Feb. 19, 2003, now Pat. No. 6,903,787.

(30) Foreign Application Priority Data

| Feb. 20, 2002 | (JP) | ............................ 2002-043227 |
| Mar. 19, 2002 | (JP) | ............................ 2002-077215 |
| Mar. 29, 2002 | (JP) | ............................ 2002-096076 |
| Mar. 29, 2002 | (JP) | ............................ 2002-096904 |

(51) Int. Cl.
*G02F 1/1337* (2006.01)
*G02F 1/1343* (2006.01)

(52) U.S. Cl. ...................... 349/129; 349/141

(58) Field of Classification Search ................ 349/141, 349/129–130
See application file for complete search history.

(56) References Cited

U.S. PATENT DOCUMENTS

| 4,934,791 | A | 6/1990 | Shimizu et al. |
| 5,757,448 | A | 5/1998 | Takei |
| 5,907,380 | A | 5/1999 | Lien |
| 6,108,061 | A | 8/2000 | Sako et al. |
| 6,407,794 | B2 * | 6/2002 | Koma .................... 349/141 |
| 6,429,914 | B1 | 8/2002 | Kubota et al. |

(Continued)

FOREIGN PATENT DOCUMENTS

CN          1096591          12/1994

(Continued)

*Primary Examiner*—James A Dudek
(74) *Attorney, Agent, or Firm*—Greer, Burns & Crain, Ltd.

(57) ABSTRACT

The invention relates to a manufacturing method of a liquid crystal display device in which an alignment direction of a liquid crystal molecule at the time of driving is regulated by using a polymer, and has an object to provide a manufacturing method of a liquid crystal display device in which excellent display characteristics can be obtained. A liquid crystal layer containing a polymerizable component capable of being polymerized by light is sealed between two substrates arranged to be opposite to each other, the polymerizable component is polymerized by irradiation of light under a predetermined light irradiation condition while a voltage is applied to the liquid crystal layer under a predetermined voltage application condition, and when a pre-tilt angle of a liquid crystal molecule and/or an alignment direction at a time of driving is regulated, at least one of the voltage application condition and the light irradiation condition is changed for each region.

7 Claims, 35 Drawing Sheets

U.S. PATENT DOCUMENTS

| | | |
|---|---|---|
| 6,657,686 B2 | 12/2003 | Choi |
| 6,778,229 B2 | 8/2004 | Inoue et al. |
| 6,989,879 B1 | 1/2006 | Nakahara et al. |
| 7,518,689 B2 * | 4/2009 | Koma .................. 349/144 |

FOREIGN PATENT DOCUMENTS

| | | |
|---|---|---|
| CN | 1216830 | 5/1999 |
| CN | 1275215 | 11/2000 |
| EP | 0749031 A1 | 12/1996 |
| JP | 01-200334 | 8/1989 |
| JP | 05-100235 | 4/1993 |
| JP | 08-278504 | 10/1996 |
| JP | 08-286193 | 11/1996 |
| JP | 08-328007 | 12/1996 |
| JP | 08-334786 | 12/1996 |
| JP | 11-237619 | 8/1999 |
| JP | 11-352499 | 12/1999 |
| JP | 2000-122065 | 4/2000 |
| JP | 2000-193976 | 7/2000 |
| JP | 2001-083523 | 3/2001 |
| JP | 2001-296533 | 10/2001 |
| WO | WO96/17273 | 6/1996 |

* cited by examiner

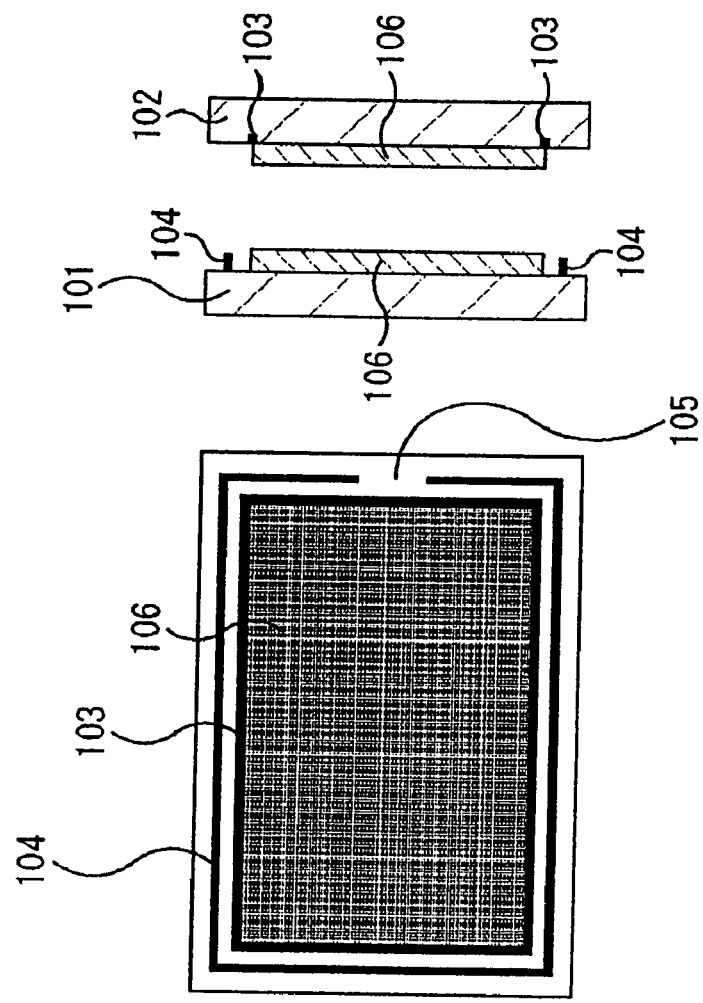
FIG. 7A
FIG. 7B
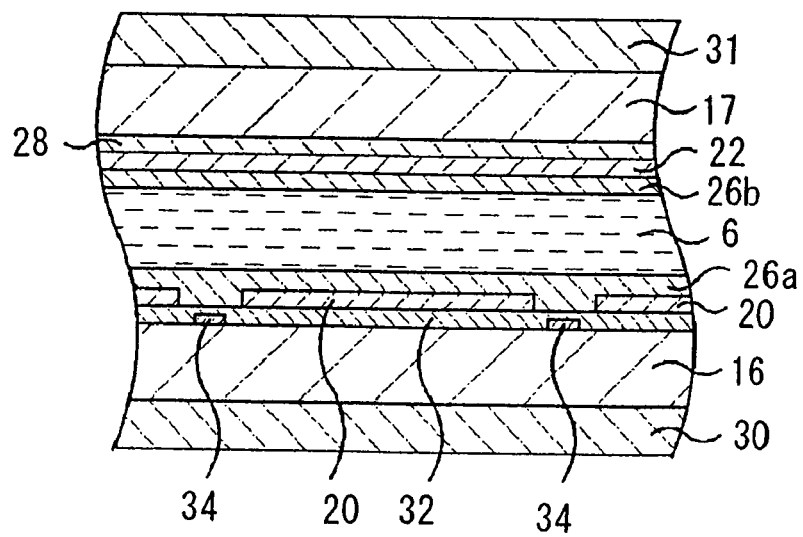
FIG. 8

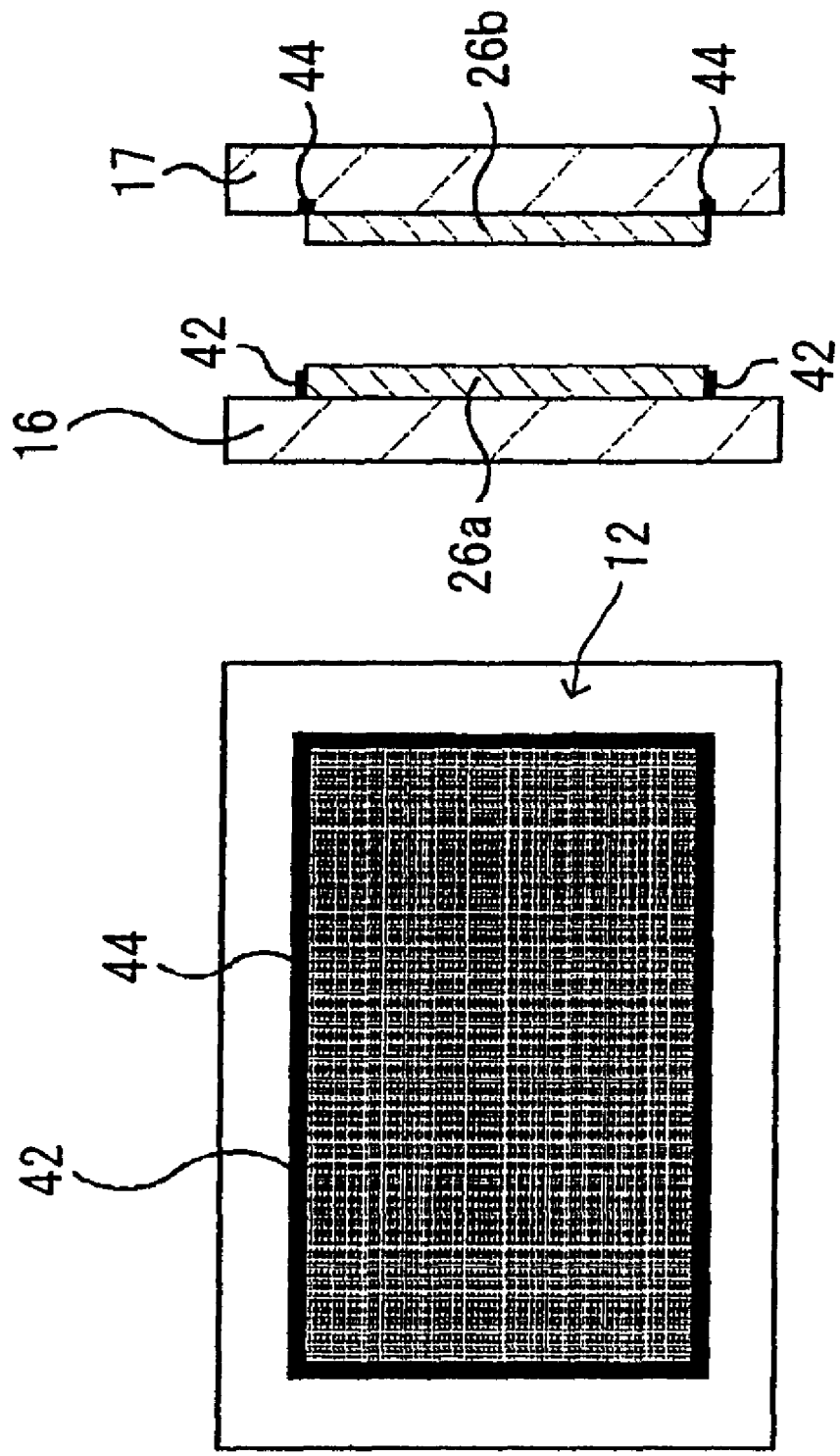

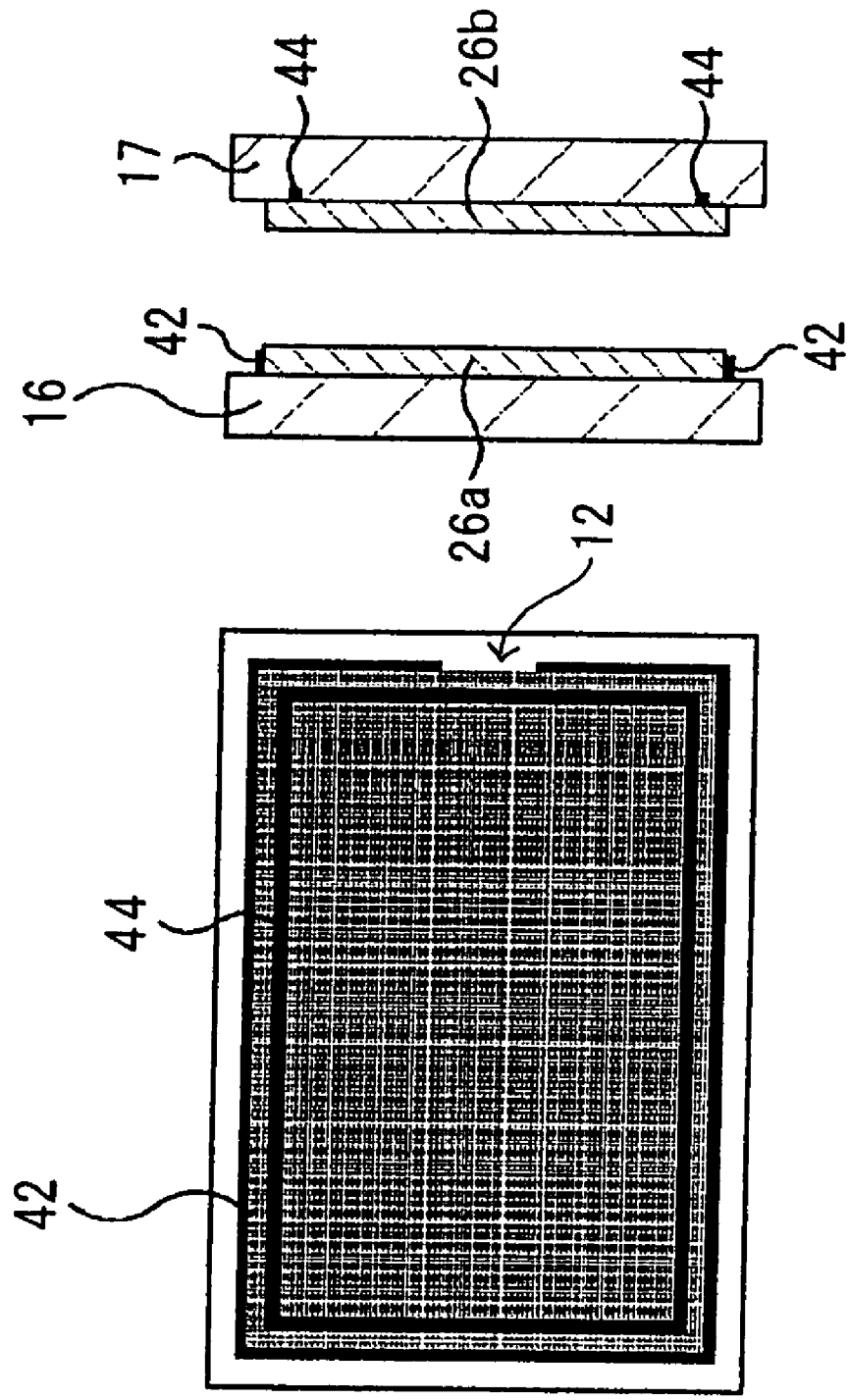

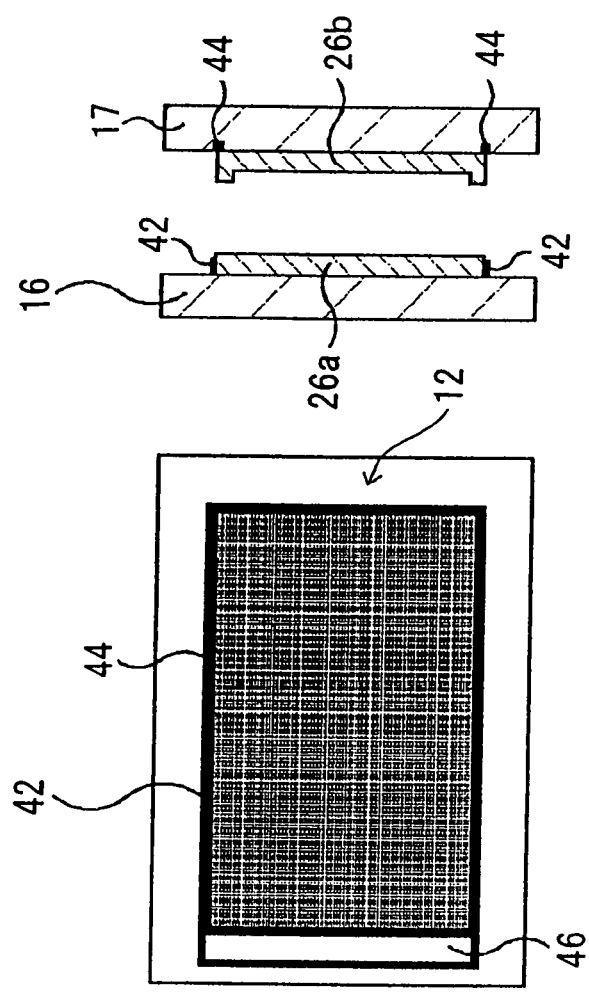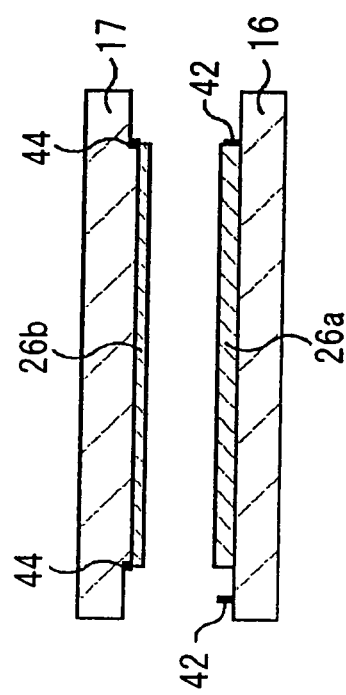
FIG. 14A  FIG. 14B  FIG. 14C

LIQUID CRYSTAL DISPLAY DEVICE'S SUBSTRATE, LIQUID CRYSTAL DISPLAY DEVICE INCLUDING THE SAME, AND MANUFACTURING METHOD OF THE SAME

This is a divisional of application Ser. No. 11/099,403, filed Apr. 5, 2005, which is a divisional of application Ser. No. 10/368,870, filed Feb. 19, 2003, now U.S. Pat. No. 6,903,787, issued Jun. 7, 2005.

BACKGROUND OF THE INVENTION

1. Field of the Invention

The present invention relates to a liquid crystal display device for regulating the alignment direction of a liquid crystal molecule at the time of driving by using a polymer, a manufacturing method of the same, and a liquid crystal display device's substrate used for the same.

Besides, the invention relates to a liquid crystal display device and a manufacturing method of the same, and particularly to a liquid crystal display device in which an uneven display can be reduced and a manufacturing method of the same.

2. Description of the Related Art

Conventionally, as an active matrix type liquid crystal display device, a twisted nematic (TN) mode is widely used in which a liquid crystal material having a positive dielectric anisotropy is aligned to be horizontal with respect to a substrate surface in a dark state and to be twisted 90 degrees between opposite substrates.

This TN mode liquid crystal display device has a problem that its visual angle characteristics are poor, and various studies have been carried out to improve the visual angle characteristics. Then, as a mode replacing the TN mode, a multi-domain vertical alignment (MVA) mode has been developed. In the MVA mode, a liquid crystal material having a negative dielectric anisotropy is vertically aligned, and by alignment regulating structures, such projections or slits, provided on a substrate surface, inclination directions of liquid crystal molecules at the time of voltage application are regulated in plural directions without performing a rubbing treatment to an alignment film. The MVA mode liquid crystal display device is greatly improved in the visual angle characteristics as compared with the TN mode.

Although the MVA mode liquid crystal display device has superior visual angle characteristics as described above, since the projections or the slits for regulating the alignment are provided, the aperture ratio is inevitably lowered. Thus, the conventional MVA mode liquid crystal display device has a problem that the transmission factor is low as compared with the TN mode liquid crystal display device and its display causes a feeling of dark. Its main cause is that portions above the alignment regulating structures become the boundaries of alignment division to generate dark lines, and the transmission factor becomes low. In order to improve the transmission factor, the arrangement intervals of the alignment regulating structures have only to be made sufficiently wide. However, in that case, since the alignment regulating structures becomes few in number, even if a predetermined voltage is applied to a liquid crystal, it takes a long time for the alignment to become stable, and the response speed becomes low.

Further, it can not be neglected that the formation itself of the minute and fine projections or slits complicates the manufacturing process and increases the manufacturing cost.

Then, in order to realize the MVA mode liquid crystal display device which has high luminance and enables high speed response, a method has been proposed in which the alignment direction of a liquid crystal molecule at the time of driving is regulated by using a polymer. In this method, a liquid crystal material in which a liquid crystal and a polymerizable component such as a monomer or an oligomer are mixed is sealed between two substrates. As the polymerizable component, a material which is polymerized by light or heat is used. In a state where a predetermined voltage is applied between the substrates to incline the polymerizable component, UV light irradiation or heating is performed to polymerize the polymerizable component and the polymer is formed. By the polymer formed in the vicinity of the surface of the substrate, even if the voltage application is removed, the liquid crystal layer in which a predetermined alignment direction and a pre-tilt angle are regulated can be obtained. Thus, a rubbing treatment of an alignment film becomes unnecessary. As stated above, when the method for giving the predetermined alignment direction and pre-tilt angle to the liquid crystal molecule by the polymer is used, it becomes possible to provide the MVA mode liquid crystal display device which has high luminance and enables high speed response. Incidentally, for further details, please refer to the specification of Japanese Patent Application (Japanese Patent Application No. 2001-98455 and No. 2001-264117) by the applicants of the present application.

FIG. 42 shows a display region of a conventional MVA mode liquid crystal display device. A liquid crystal material in which a monomer is mixed is injected through a liquid crystal injection port 12 formed at one end part of a panel. While the injected liquid crystal material diffuses in a narrow cell gap, the distribution of the monomer becomes irregular in a display region 10. Especially, in regions $\beta$ in the vicinities of two corners at the side opposite to the liquid crystal injection port 12, the concentration of the monomer becomes low as compared with another region $\alpha$. Thus, in the regions $\beta$, a pre-tilt angle of a liquid crystal molecule obtained after a polymer is formed by irradiation of UV light becomes larger than that in the other region $\alpha$. Here, the pre-tilt angle is an inclination angle of a liquid crystal molecule with respect to a substrate surface in a state where a voltage is not applied to a liquid crystal layer. That is, when the pre-tilt angle is 90°, the liquid crystal molecule is aligned vertically to the substrate surface.

FIG. 43 shows a luminance distribution on line A-A' of a display screen of the liquid crystal display device shown in FIG. 42. The horizontal axis indicates position on the line A-A', and the vertical axis indicates luminance. A left end part of the display region 10 on the line A-A' is denoted by A0, a boundary between the region $\alpha$ and the region $\beta$ is denoted by A1, and a right end part of the display region 10 is denoted by A2. Incidentally, this liquid crystal display device has a normally black mode, and it is assumed that the same gradation is displayed on the whole display region 10. As shown in FIG. 43, the almost uniform luminance distribution is obtained in the region $\alpha$, however, in the region $\beta$, as compared with the region $\alpha$, the luminance is lowered since the pre-tilt angle of the liquid crystal molecule is larger than that in the region $\alpha$. Thus, an uneven luminance is seen on the display screen.

Besides, in the conventional color liquid crystal display device, when a half tone (gray scale) is displayed, coloring is seen. That is, at the change of the gradation from white to black, the chromaticity is changed. This phenomenon indicates that a different color is reproduced in not only in achromatic color but also in chromatic color, and there occurs a problem that a desired display image can not be obtained. Its cause is that since wavelengths of light transmitting through respective colors of color filter (CF) resin layers are different from one another, the substantial magnitudes of retardations including the liquid crystal layer are different among the respective colors, and the transmission characteristics (T-V characteristic) are different among the respective colors.

As measures to the above problem, a method called multi-gap is proposed in which a cell gap is changed for each pixel different in color. However, the manufacture in which the cell gap is controlled for each pixel has a problem that the process becomes complicated and the manufacturing cost is increased.

As other measures, there is a method in which an input signal is converted by a signal conversion element such as a scaler IC, and the T-V characteristics for each color are adjusted. However, the scaler IC including a frame memory is expensive and lacks versatility.

Besides, in an MVA mode liquid crystal display device using a method for giving a pre-tilt angle by using a polymer structure, as shown in FIG. 44, there is a case where an uneven display 100 occurs in the vicinity of a corner part 50 opposite to a liquid crystal injection port 12 in a half tone display. FIG. 44 is a schematic view showing the conventional liquid crystal display device. Thus, a technique of reducing the uneven display 100 has been awaited.

SUMMARY OF THE INVENTION

An object of the present invention is to provide a liquid crystal display device in which excellent display characteristics can be obtained, a manufacturing method of the same, and a liquid crystal display device's substrate used for the same.

Besides, another object of the invention is to provide a liquid crystal display device in which an open area ratio is improved easily and certainly without causing defects such as an uneven display and a highly reliable liquid crystal display is realized, and a manufacturing method of the same.

Further, a still another object of the invention is to provide a liquid crystal display device having a less uneven display and a manufacturing method of the same.

The above objects are achieved by a manufacturing method of a liquid crystal display device characterized in that a liquid crystal layer containing a polymerizable component capable of being polymerized by light is sealed between two substrates arranged to be opposite to each other, the polymerizable component is polymerized by irradiation of light under a predetermined light irradiation condition while a voltage is applied to the liquid crystal layer under a predetermined voltage application condition, and when a pre-tilt angle of a liquid crystal molecule and/or an alignment direction at a time of driving is regulated, at least one of the voltage application condition and the light irradiation condition is changed for each region.

Besides, the above objects can be achieved by a liquid crystal display device in which a first substrate including a first electrode and a second substrate including a second electrode are bonded through an alignment film and a liquid crystal layer, and which is characterized in that polymer structures for aligning liquid crystal molecules in a predetermined direction are formed in a liquid crystal of the liquid crystal layer, and the liquid crystal molecules have pre-tilt angles substantially equal to each other between a display part of the liquid crystal layer and its peripheral part.

Further, the above objects can be achieved by a manufacturing method of a liquid crystal display device in which a first substrate including a first electrode and a second substrate including a second electrode are bonded by a seal member through an alignment film and a liquid crystal layer, and which is characterized in that the alignment film and the seal member are disposed to be substantially in contact with each other, and when the liquid crystal layer is formed, a liquid crystal in which monomers for aligning liquid crystal molecules in a predetermined direction are mixed is used, the liquid crystal is injected so that the liquid crystal molecules have a same alignment over almost the whole surface of the liquid crystal layer, and then, the monomers are polymerized to form polymer structures of a predetermined alignment pattern, and the liquid crystal molecules are subjected to alignment regulation by the polymer structures.

Besides, the above objects can be achieved by a liquid crystal display device comprising a pair of substrates disposed to be opposite to each other, a liquid crystal sealed between the pair of substrates, and a seal member for sealing peripheries of the pair of substrates, and characterized in that a structure for slowing an injection speed of the liquid crystal in a vicinity of the seal member when the liquid crystal is injected into a space between the pair of substrates is provided in the vicinity of the seal member.

Further, the above objects can be achieved by a manufacturing method of a liquid crystal display device comprising a pair of substrates disposed to be opposite to each other, a liquid crystal sealed between the pair of substrates, and a seal member for sealing peripheries of the pair of substrates, and characterized in that at a step of injecting the liquid crystal into a space between the pair of substrates, the liquid crystal is injected into the space between the pair of substrates so that an injection speed of the liquid crystal in a vicinity of the seal member is lower than an injection speed of the liquid crystal in a display region.

BRIEF DESCRIPTION OF THE DRAWINGS

FIGS. 7A and 7B are schematic views showing a state of a liquid crystal display device of a comparative example at the time of formation of a liquid crystal layer;

FIG. 8 is a sectional view showing the main construction of a liquid crystal display device according to various examples of a second embodiment of the invention;

FIGS. 11A and 11B are schematic views showing a state at the time of formation of a liquid crystal layer of a liquid crystal display device according to example 2-1 of the second embodiment of the invention;

FIGS. 12A ands 12B are schematic views showing a state at the time of formation of a liquid crystal layer of a liquid crystal display device according to example 2-2 of the second embodiment of the invention;

FIGS. 14A to 14C are schematic views showing a state at the time of formation of a liquid crystal layer of a liquid crystal display device according to example 2-4 of the second embodiment of the invention;

DESCRIPTION OF THE PREFERRED EMBODIMENTS

First Embodiment

A liquid crystal display device according to a first embodiment of the invention, a manufacturing method of the same, and a liquid crystal display device's substrate used for the same will be described by using examples.

Example 1-1

Figure 1:
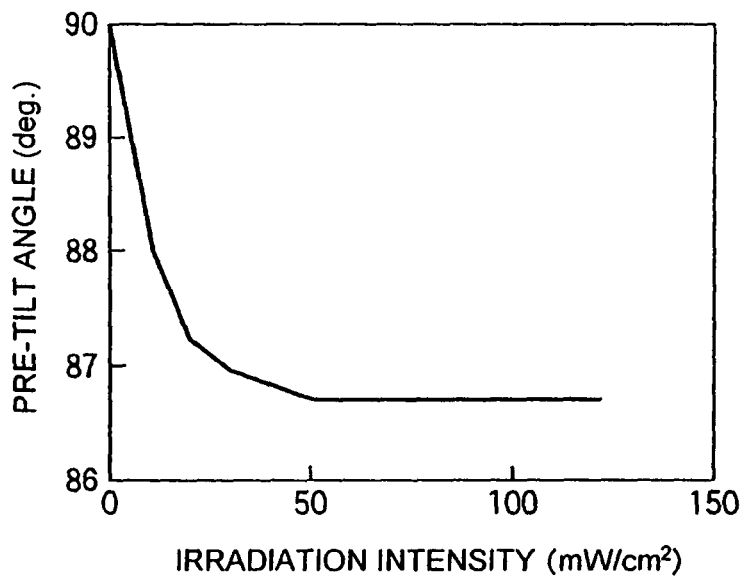
FIG. 1 is a graph showing the relation between an irradiation intensity of UV light and a pre-tilt angle of a liquid crystal molecule.
Figure 2:
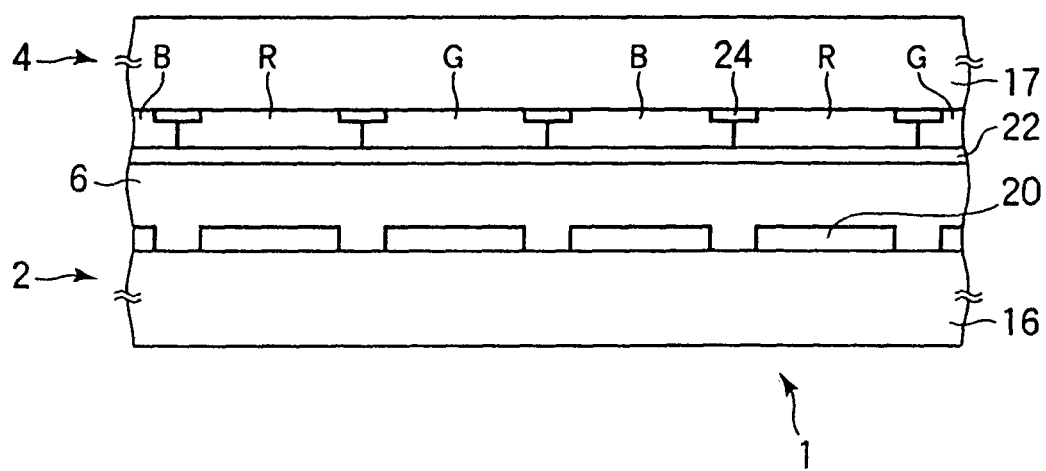
FIG. 2 is a sectional view showing a schematic construction of a liquid crystal display device according to example 1-1 of a first embodiment.

First, a liquid crystal display device according to example 1-1 of this embodiment and a manufacturing method thereof will be described with reference to FIGS. 1 to 3. In this example, when a polymer for regulating the alignment of a liquid crystal molecule at the time of driving is formed, the irradiation intensity of UV light to be irradiated is made different for each region, so that the same pre-tilt angle is given to a liquid crystal layer in the whole display region. By this, uniform T-V characteristics can be obtained in the whole display region.

The principle of the manufacturing method of the liquid crystal display device according to this example will be described. FIG. 1 is a graph showing the relation between the irradiation intensity of UV light and the pre-tilt angle of a liquid crystal molecule. The horizontal axis indicates the irradiation intensity ($mW/cm^2$) of the UV light, and the vertical axis indicates the pre-tilt angle (deg.) of the liquid crystal molecule obtained after the irradiation of the UV light. Incidentally, a voltage (for example, 5 V) by which a display screen has white luminance is applied to a liquid crystal layer. An irradiation time of the UV light is 100 seconds. As shown in FIG. 1, as the irradiation intensity of the UV light becomes high, the pre-tilt angle of the liquid crystal molecule obtained after the irradiation of the UV light becomes small. However, the pre-tilt angle of the liquid crystal molecule becomes almost constant at an irradiation intensity of 50 mW/cm$^2$ or more.

Figure 42:
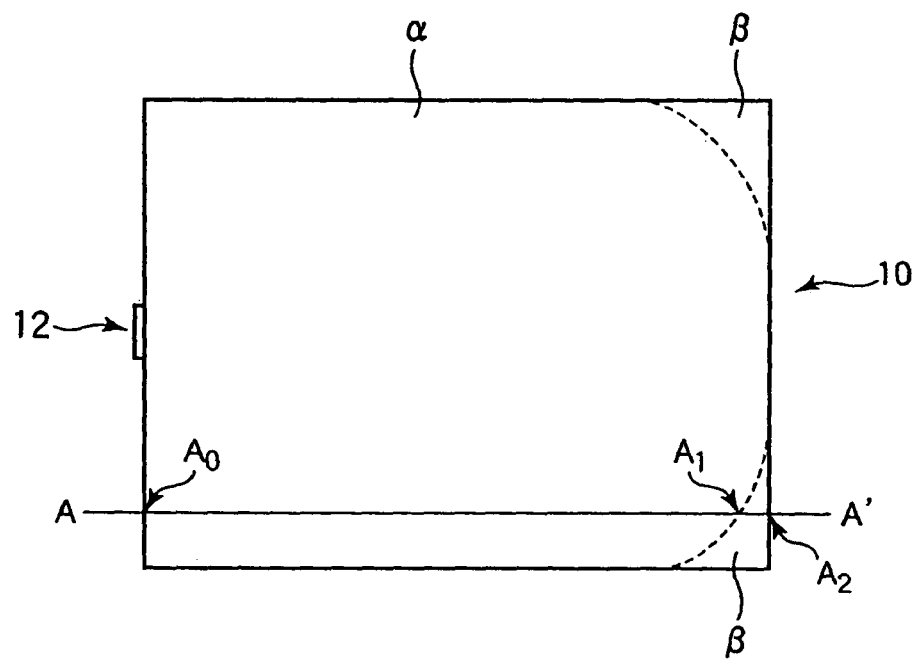
FIG. 42 is a view showing a display region of a conventional liquid crystal display device.

In this example, the UV light with irradiation intensity B is irradiated to the region α as shown in FIG. 42, and the UV light with irradiation intensity B' (B'>B) higher than the irradiation intensity B is irradiated to the region β to polymerize a monomer. By this, even in the region β in which the concentration of the monomer is lower than that in the region α, the pre-tilt angle almost equal to that of the region α can be obtained by the irradiation of the UV light with the irradiation intensity B' higher than the irradiation intensity B. That is, the T-V characteristic of the region α and the T-V characteristic of the region β become almost equal to each other, and an uneven luminance occurring on the display screen can be reduced.

Next, the manufacturing method of the liquid crystal display device according to this example will be described more specifically. FIG. 2 shows a schematic sectional construction of a liquid crystal display panel 1 used for this example. As shown in FIG. 2, the liquid crystal display panel 1 is constituted by a thin film transistor (TFT) substrate 2 and a CF substrate 4 disposed to be opposite to the TFT substrate 2. The TFT substrate 2 includes pixel electrodes 20 formed for respective pixels on a glass substrate 16. The CF substrate 4 includes light-shielding films 24 for defining the respective pixels on a glass substrate 17. A CF resin layer of one of red (R), green (G) and blue (B) is formed on each pixel. A common electrode 22 is formed on the CF resin layers of R, G and B.

A liquid crystal layer 6 in which a liquid crystal and a light polymerizable monomer are mixed is sealed between the TFT substrate 2 and the CF substrate 4. The liquid crystal layer 6 is injected through a liquid crystal injection port 12 (not shown in FIG. 2) formed at one end part of the liquid crystal display panel 1.

First, a voltage by which a display screen has white luminance is applied between the pixel electrode 20 on the TFT substrate 2 and the common electrode 22 on the CF substrate 4. Subsequently, in the state where the voltage is applied between both the electrodes 20 and 22, UV light is irradiated through a prescribed mask to polymerize the monomer in the liquid crystal layer 6. A drawing pattern of a gray mask is formed in the mask so that the transmission factor of the region β becomes higher than the transmission factor of the region α. By this, the intensity of the UV light irradiated to the liquid crystal layer in the region β becomes higher than that in the region α. The liquid crystal display device is completed through the above process.

Figure 3:
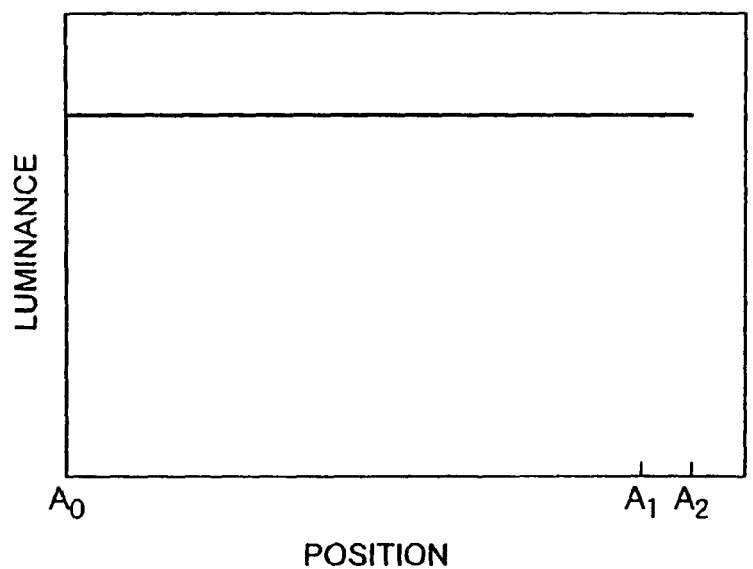
FIG. 3 is a graph showing the luminance distribution of a display region of the liquid crystal display device according to the example 1-1 of the first embodiment.
Figure 43:
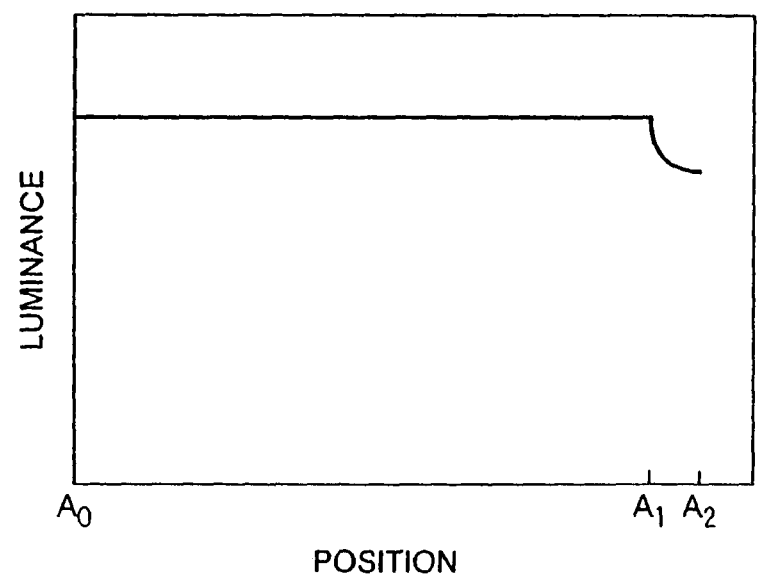
FIG. 43 is a graph showing a luminance distribution of the conventional liquid crystal display device.
Figure 44:
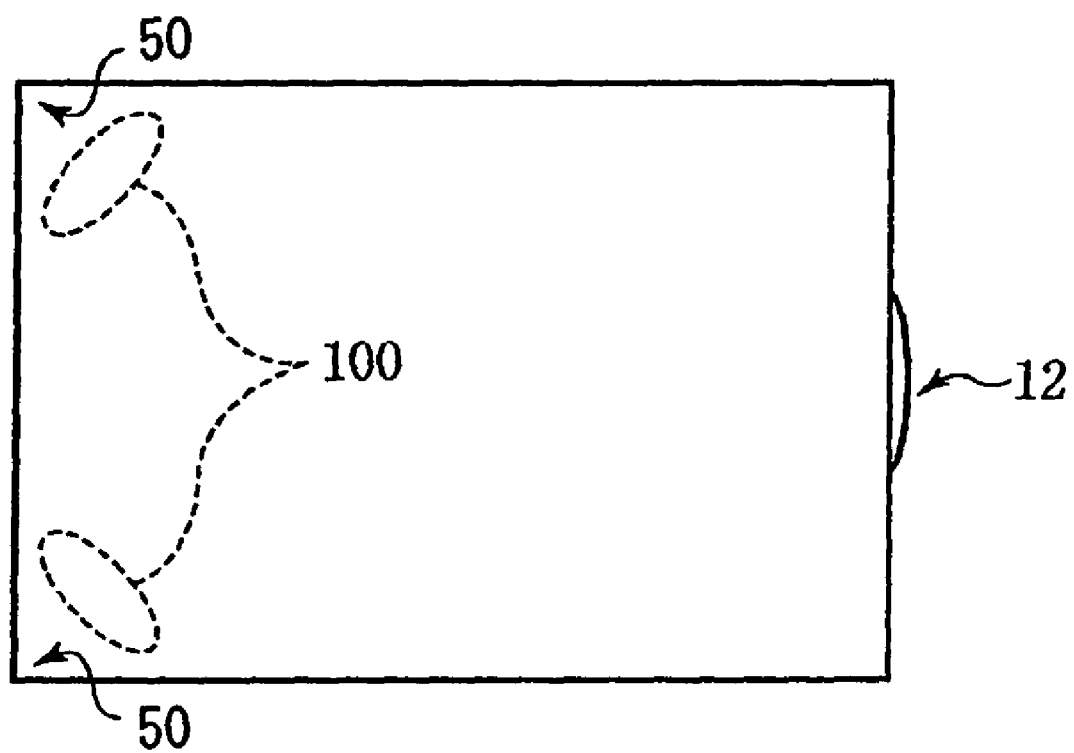
FIG. 44 is a schematic view showing the conventional liquid crystal display device.

FIG. 3 is a graph showing the luminance distribution of the liquid crystal display device fabricated by using the manufacturing method of the liquid crystal display device according to this example and corresponding to FIG. 43. As shown in FIG. 3, according to this example, the luminance in the region β is improved and the almost uniform luminance distribution can be obtained in the whole display region 10. Accordingly, the liquid crystal display device which has no uneven luminance and has excellent display characteristics can be obtained.

Besides, according to this example, even in a region where a cell gap is different from that of another region, for example, in the vicinity of the liquid crystal injection port 12 or in the vicinity of a seal member, the T-V characteristic can be made almost equal to that in the other region by making the pre-tilt angle of the liquid crystal molecule different. Accordingly, excellent display characteristics can be obtained in which the uneven luminance does not exist in the vicinity of the liquid crystal injection port 12 of the display region 10 or in the vicinity of a frame.

Incidentally, when the manufacturing method of the liquid crystal display device according to this example is used, an uneven luminance of the display region 10 caused by the luminance distribution of a light source device such as a backlight unit can also be reduced. If the luminance distribution of the light source device on the display region 10 is previously grasped, correspondingly to the luminance distribution, the UV light with high irradiation intensity is irradiated to a region having a relatively high luminance so that the pre-tilt angle of a liquid crystal molecule becomes small. The UV light with low irradiation intensity is irradiated to a region having a relatively low luminance so that the pre-tilt angle of a liquid crystal molecule becomes large. As stated above, correspondingly to the luminance distribution of a light source device the T-V characteristics of the respective regions of the liquid crystal display panel 1 are intentionally made different from one another, so that the uneven luminance occurring on the display screen can be reduced and excellent display characteristics can be obtained.

Example 1-2

Next, a manufacturing method of a liquid crystal display device according to example 1-2 of this embodiment will be described with reference to FIG. 4. In this example, in order to give different pre-tilt angles to liquid crystal molecules of a pixel in which a CF resin layer of R is formed (hereinafter referred to as an R pixel), a pixel in which a CF resin layer of G is formed (hereinafter referred to as a G pixel), and a pixel in which a CF resin layer of B is formed (hereinafter referred to as a B pixel), different voltages are applied to the liquid crystal layer 6 for the respective colors when UV light is irradiated to polymerize a monomer.

Figure 4:
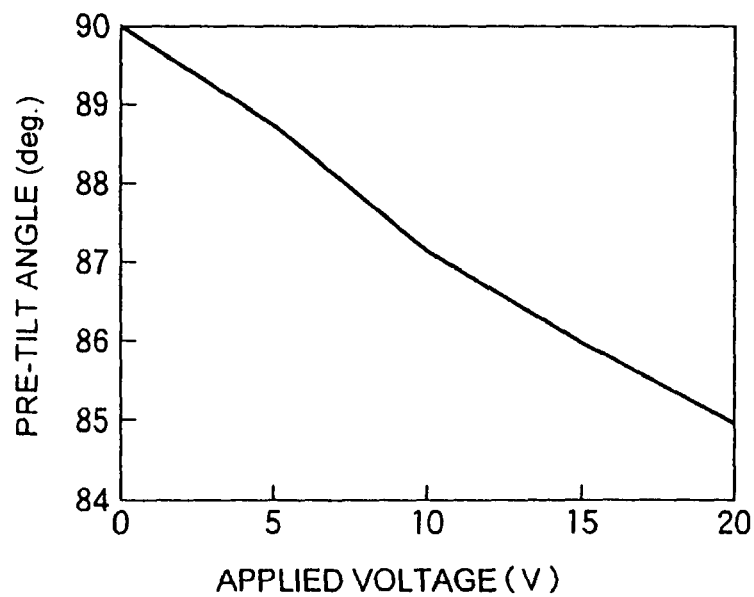
FIG. 4 is a graph showing the relation between an applied voltage and a pre-tilt angle of a liquid crystal molecule.

FIG. 4 is a graph showing the relation between the applied voltage and the pre-tilt angle of a liquid crystal molecule. The horizontal axis indicates the applied voltage (V) to the liquid crystal layer 6, and the vertical axis indicates the pre-tilt angle (deg.) of the liquid crystal molecule obtained after the irradiation of a predetermined irradiation amount of UV light. As shown in FIG. 4, as the applied voltage to the liquid crystal layer 6 when the UV light is irradiated becomes large, the pre-tilt angle of the liquid crystal molecule becomes small.

In this example, for example, a predetermined voltage Vr is applied to the liquid crystal layer 6 of the R pixel, a voltage Vg having an absolute value smaller than the voltage Vr is applied to the liquid crystal layer 6 of the G pixel, and a voltage Vb having an absolute value smaller than the voltage Vg is applied to the liquid crystal layer 6 of the B pixel (|Vr|>|Vg|>|Vb|). When the monomer is polymerized by the irradiation of the UV light in this state, the pre-tilt angle of the liquid crystal molecule of the R pixel becomes relatively small, and the pre-tilt angle of the liquid crystal molecule becomes large in sequence of the G pixel and the B pixel. By this, a retardation is increased which occurs in the liquid crystal layer 6 of the R pixel through which red light susceptible to transmission factor relatively smaller than green is transmitted, and a retardation is decreased which occurs in the liquid crystal layer 6 of the B pixel through which blue light susceptible to transmission factor relatively larger than green is transmitted. As stated above, by correcting the light refractive indexes different among the respective colors, the substantial magnitudes of the retardations occurring in the liquid crystal layer 6 of the respective pixels can be made substantially equal to one another. Accordingly, the T-V characteristics in the display region can be made uniform, and a desired display image can be obtained.

Next, the manufacturing method of the liquid crystal display device according to this example will be described more specifically with reference to FIG. 2. First, as shown in FIG. 2, voltages Vr, Vg and Vb (|Vr|>|Vg|>|Vb|) are applied to the liquid crystal layer 6 of the respective pixels of R, G and B. Subsequently, a predetermined irradiation amount of UV light is irradiated in the state where the voltages are applied to the liquid crystal layer 6 and the monomer in the liquid crystal layer 6 is polymerized. The liquid crystal display device is completed through the above process.

Next, a description will be given of a modified example of the manufacturing method of the liquid crystal display device according to this example and a liquid crystal display device's substrate used for the same. In the CF substrate 4 used for this modified example, for example, CF resin layers R, G and B are respectively formed of different forming materials or to have different film thicknesses. When the transmission factor of each pixel of R, G and B of the CF substrate 4 is made Tr, Tg and Tb, an inequality of Tr>Tg>Tb is satisfied. When the UV light is irradiated to the liquid crystal layer 6 from the side of the CF substrate 2, the irradiation intensity of the UV light to the liquid crystal layer 6 becomes relatively large in the R pixel, and becomes small in sequence of the G pixel and the B pixel. Thus, as shown in FIG. 1, the pre-tilt angle of the liquid crystal molecule of the R pixel becomes relatively small, and the pre-tilt angle of the liquid crystal molecule becomes large in sequence of the G pixel and the B pixel. Accordingly, also in this example, the same effect as the above example can be obtained.

In the above examples 1-1 and 1-2, the irradiation intensity of the UV light and the applied voltage are changed for each region, so that the T-V characteristics in the display region are made uniform, however, another method can also be used.

Figure 5:
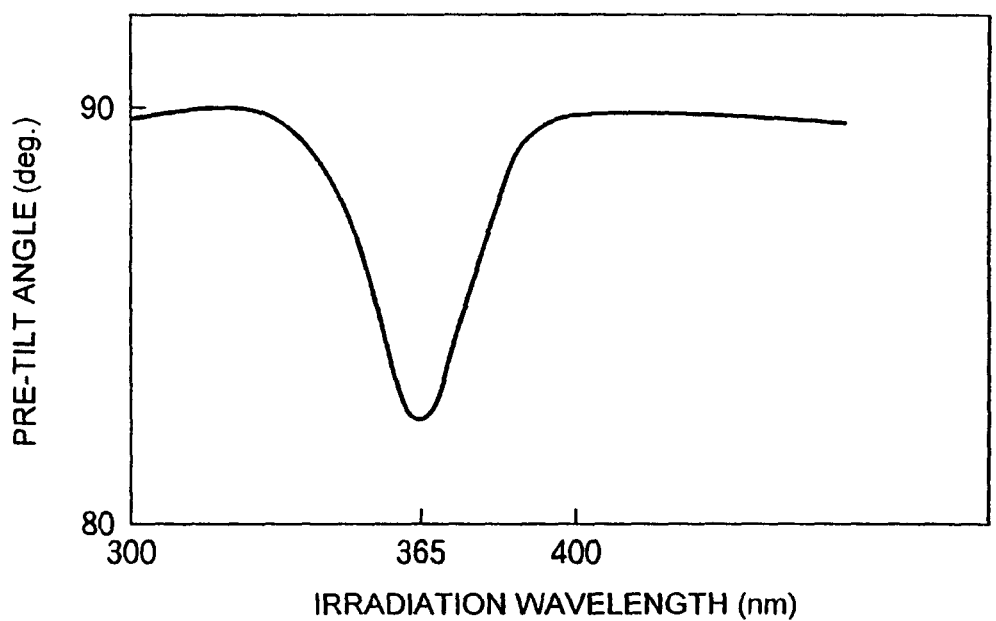
FIG. 5 is a graph showing the relation between an irradiation wavelength of UV light and a pre-tilt angle of a liquid crystal molecule.

FIG. 5 is a graph showing the relation between an irradiation wavelength of UV light and a pre-tilt angle of a liquid crystal molecule. The horizontal axis indicates the irradiation wavelength (nm) of the UV light, and the vertical axis indicates the pre-tilt angle (deg.) of the liquid crystal molecule obtained after the irradiation of the UV light. Incidentally, a predetermined voltage is applied to the liquid crystal layer 6, and a predetermined irradiation amount of UV light is irradiated. As shown in FIG. 5, when UV light with an irradiation wavelength of about 365 nm is irradiated, the pre-tilt angle of the liquid crystal molecule becomes smallest. Incidentally, the irradiation wavelength at which the pre-tilt angle of the liquid crystal molecule becomes smallest varies by the monomer mixed in the liquid crystal.

When the UV light is irradiated, the irradiation wavelength of the UV light irradiated to the liquid crystal layer 6 can be controlled by using filters through which lights with different irradiation wavelengths for respective regions are transmitted. As stated above, by changing the irradiation wavelength of the UV light for the respective regions, the same effect as the examples 1-1 and 1-2 can be obtained.

Figure 6:
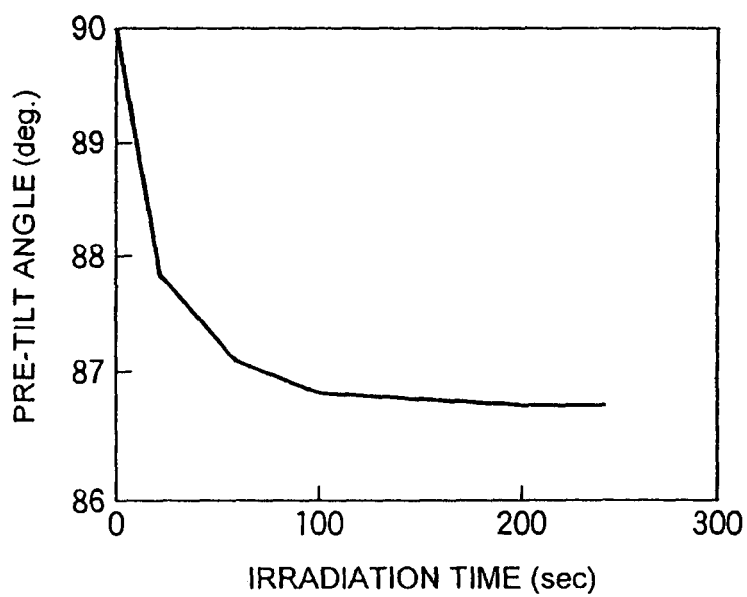
FIG. 6 is a graph showing the relation between an irradiation time of UV light and a pre-tilt angle of a liquid crystal molecule.

FIG. 6 shows the relation between an irradiation time of UV light and a pre-tilt angle of a liquid crystal molecule. The horizontal axis indicates the irradiation time (sec) of the light, and the vertical axis indicates the pre-tilt angle (deg.) of the liquid crystal molecule obtained after the irradiation of the UV light. Incidentally, a predetermined voltage is applied to the liquid crystal layer 6, and the UV light with a predetermined irradiation intensity is irradiated. As shown in FIG. 6, the pre-tilt angle of the liquid crystal molecule becomes small as the irradiation time becomes long until about 100 seconds. However, the pre-tilt angle of the liquid crystal molecule hardly changes when the irradiation time exceeds 100 seconds.

The irradiation time can be changed for each region by irradiating the UV light while a mask formed to have a predetermined drawing pattern is moved, and a boundary part does not become noticeable on the display screen of the completed liquid crystal display device. As described above, by changing the irradiation time of the UV light for each region, the same effect as the examples 1-1 and 1-2 can be obtained.

As described above, according to this embodiment, it is possible to realize the liquid crystal display device in which excellent display characteristics can be obtained.

Second Embodiment

Next, a liquid crystal display device according to a second embodiment of the invention will be described.

(Basic Point)

First, the basic point of this embodiment will be described.

As a method in which an MVA mode liquid crystal display device is improved to raise an aperture ratio and to increase brightness, and is also improved in cost, the present inventor et al. have developed an alignment regulating technique of obtaining a stable alignment by mixing a monomer, which is polymerized by light or heat, into a liquid crystal and by polymerizing it.

However, the alignment regulating technique has a problem relating to liquid crystal injection as described below.

That is, as shown in FIGS. 7A and 7B, concerning a substrate (TFT substrate) 101 on which an active element, for example, a TFT is provided, a seal member 104 for bonding a substrate (CF substrate) 102, which is disposed to be opposite to the former substrate and on which a CF (not shown) and a black matrix (BM) 103 are provided, is provided on the outer peripheral part thereof. A liquid crystal injection port 105 is provided in one side of the seal member 104. Irregular black occurs in a half tone display at both end parts of a side opposite to the liquid crystal injection port 105. According to the study by the present inventor et al., it has been found that the occurrence of the irregular black is caused from the fact that the injection speed of an injected liquid crystal in a non-display part (region between the BM 103 and the seal member 104) as a peripheral part of a display part is higher than that in the display part (region within the BM 103; here, it is coincident with a disposition part of an alignment film 106) of an image.

As a result of a further detailed study, it has been found that as a portion of the non-display part which has no vertical alignment, that is, a region outside the alignment film 106 (it has horizontal alignment) becomes wide, the liquid crystal injection speed in the non-display part becomes high. In general, the liquid crystal injection speed in the vertical alignment part is low, and that in the horizontal alignment part is high. Then, the present inventor thought of controlling the alignment of the non-display part to be almost equal to the alignment (here, vertical) of the display part. Specifically, as described below in detail, it is appropriate that the seal member and the alignment film are made to approach each other so that the area of the non-display part becomes as small as possible, or an oil repellent treatment is performed to the non-display part so that the liquid crystal of the non-display part is made to have a pseudo vertical alignment. By this, the liquid crystal injection speed can be unified, and the occurrence of the irregular black in the half tone display can be suppressed.

Specific Examples

On the basis of the foregoing basic point of this embodiment, specific examples will be described. Here, a liquid crystal display device including a main construction as shown in FIG. 8 is made an object.

This liquid crystal display device is constituted by a pair of transparent glass substrates 16 and 17 spaced by a predetermined interval and opposite to each other, and a liquid crystal layer 6 sandwiched between these transparent glass substrates 16 and 17. The transparent glass substrates 16 and 17 are bonded and fixed by a not-shown seal member.

Plural pixel electrodes 20 made of ITO and not-shown TFTs as active elements are formed on the one transparent glass substrate (TFT substrate) 16 through an insulating layer 32, and a transparent vertical alignment film 26a is formed so as to cover the pixel electrodes 20. A CF 28 (and a not-shown BM), a common electrode (opposite electrode) 22, and a vertical alignment film 26b are sequentially stacked on the other transparent glass substrate (CF substrate) 17. Then, the vertical alignment films 26a and 26b are made to opposite to each other to hold the liquid crystal layer 6 therebetween, the glass substrates 16 and 17 are fixed by the seal member, and polarizers 30 and 31 are provided outside the respective substrates 16 and 17. The pixel electrodes 20 are formed together with an active matrix (TFT matrix), and in the illustrated example, a data bus line (drain bus line) 34 to which a drain electrode of a TFT is connected is shown. Besides, although not shown, a gate bus line to which a gate electrode of the TFT is connected is also formed. Incidentally, the electrodes may be provided on only one substrate.

Figure 9:
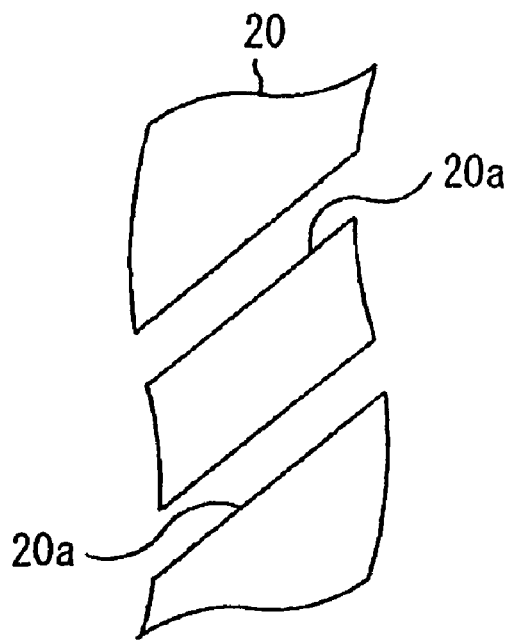
FIG. 9 is a plan view showing a part of a pixel electrode in which minute slits forming an alignment pattern are formed.
Figure 10:
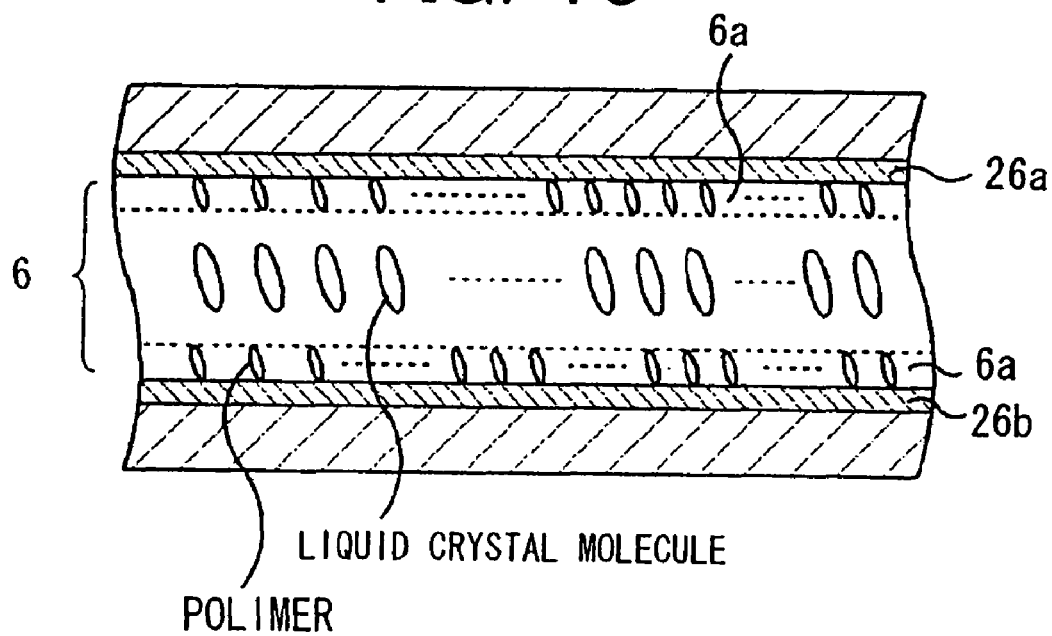
FIG. 10 is a sectional view showing a state at the time of formation of a liquid crystal layer.

The liquid crystal layer 6 is formed by injecting a liquid crystal through a liquid crystal injection port provided in the seal member. In this example, monomers which are polymerized by light or heat are mixed in the liquid crystal. Further, for example, as shown in FIG. 9, minute slits 20a forming an alignment pattern is formed in the pixel electrode 20. Then, as shown in FIG. 10, UV irradiation or heat treatment is performed while a predetermined alternating voltage is applied to the injected liquid crystal, so that the monomers are polymerized and polymer structures 6a regulated by the alignment pattern of the slits 20a are formed in the surface layers (surfaces of the vertical alignment films 26a and 26b) of the liquid crystal layer 6. The liquid crystal molecules are regulated by the polymer structures 6a and are aligned in accordance with the alignment pattern.

Example 2-1

FIGS. 11A and 11B are schematic views showing a state at the time of formation of a liquid crystal layer of a liquid crystal display device according to example 2-1 of this embodiment. FIG. 11A is a plan view and FIG. 11B is a sectional view along a short side.

In this liquid crystal display device, a seal member 42 surrounding a vertical alignment film 26a is provided on a TFT substrate 16, and a BM 44 covering the periphery of a vertical alignment film 26b is provided on a CF substrate 17. The seal member 42 is disposed adjacent to the vertical alignment film 26a, and a non-display part of a region between the BM 44 and the seal member 42 is made very narrow (there is also a case where they are made to coincide with each other). It is preferable that the width of this non-display part is made, for example, 0.5 mm or less.

In this state, the liquid crystal is injected through a liquid crystal injection port 12 provided in one side of the seal member 42. At this time, since the non-display part hardly exists, and the vertical alignment films 26a and 26b cover the inner region of the seal member 42, liquid crystal molecules are regulated by these over the whole surface, and the liquid crystal injection is performed in the state of vertical alignment. Accordingly, in this case, the difference in liquid crystal injection speed as described above does not occur, the liquid crystal layer 6 is formed at a uniform injection speed, and the occurrence of the irregular black due to the difference of the liquid crystal injection speed is suppressed.

As described above, according to the liquid crystal display device of this example, it is possible to easily and certainly improve the aperture ratio without causing defects such as an uneven display and to realize the liquid crystal display having high reliability.

Example 2-2

FIGS. 12A and 12B are schematic views showing a state at the time of formation of a liquid crystal layer of a liquid crystal display device according to example 2-2 of this embodiment. FIG. 12A is a plan view and FIG. 12B is a sectional view taken along a short side.

In this liquid crystal display device, a seal member 42 surrounding a vertical alignment film 26a is provided on a TFT substrate 16, and a BM 44 covering the periphery of a vertical alignment film 26b is provided on a CF substrate 17. The vertical alignment films 26a and 26b exceed the BM 44 and are disposed to expand to the seal member 42. In this case, a region between the vertical alignment film 26a or 26b and the seal member 42 is made very narrow (there is also a case where they are made to coincide with each other). It is preferable that the width of this region is made, for example, 0.5 mm or less.

In this state, the liquid crystal is injected through a liquid crystal injection port 12 provided in one side of the seal member 42. At this time, since a non-display part hardly exists, and the vertical alignment films 26a and 26b cover the inner region of the seal member 42, liquid crystal molecules are regulated by these over the whole surface, and the liquid crystal injection is performed in the state of vertical alignment. Accordingly, in this case, the difference in liquid crystal injection speed as described above does not occur, the liquid crystal layer 6 is formed at a uniform injection speed, and the occurrence of the irregular black due to the difference in the liquid crystal injection speed is suppressed.

As described above, according to the liquid crystal display device of this example, the aperture ratio can be easily and certainly improved without causing defects such as an uneven display, and the liquid crystal display having high reliability can be realized.

Example 2-3

Figures 13A, 13B:
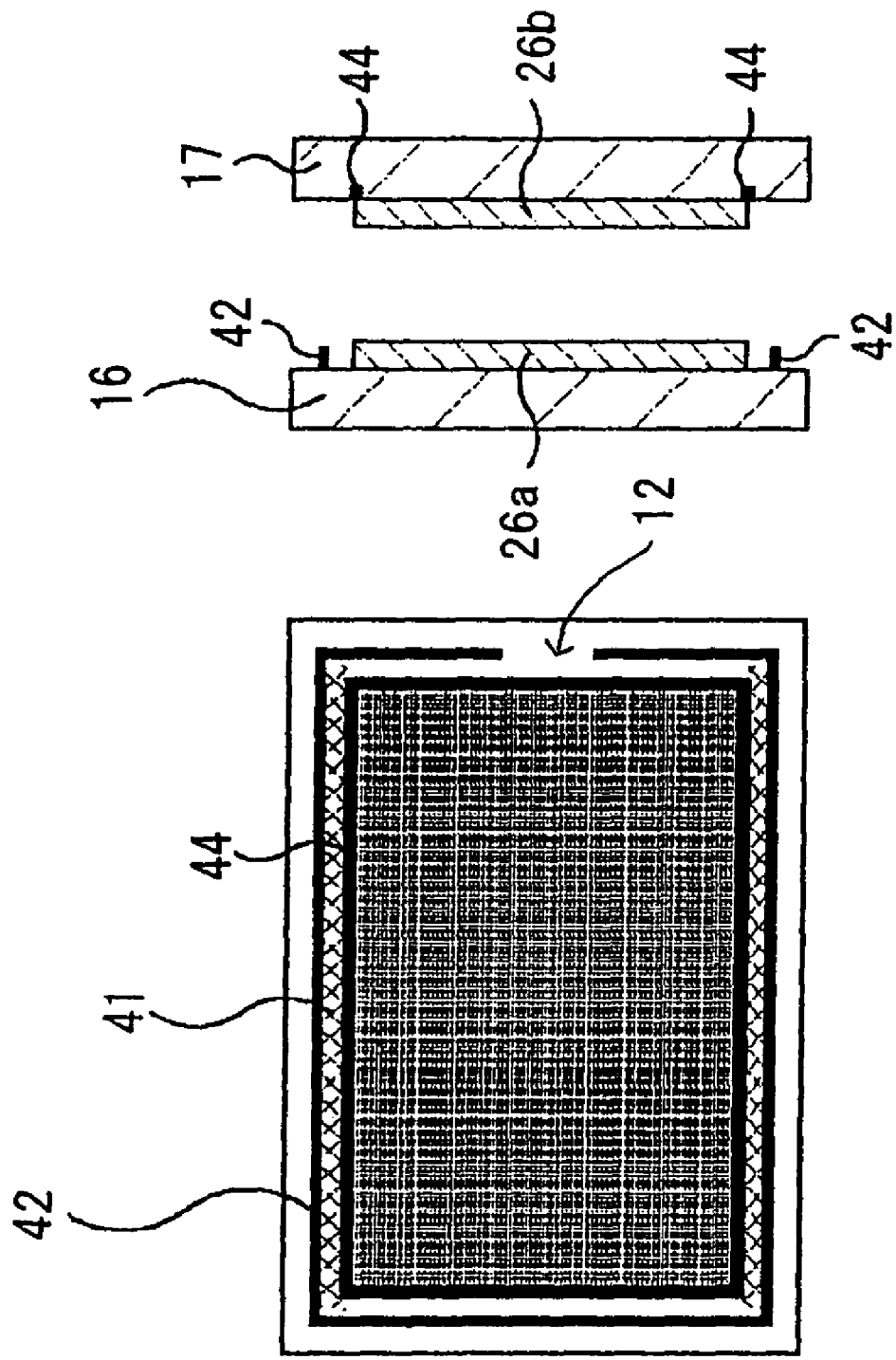
FIGS. 13A and 13B are schematic views showing a state at the time of formation of a liquid crystal layer of a liquid crystal display device according to example 2-3 of the second embodiment of the invention.

FIGS. 13A and 13B are schematic views showing a state at the time of formation of a liquid crystal layer of a liquid crystal display device according to example 2-3 of this embodiment. FIG. 13A is a plan view and FIG. 13B is a sectional view taken along a short side.

In this liquid crystal display device, a seal member 42 surrounding a vertical alignment film 26a is provided on a TFT substrate 16, and a BM 44 covering the periphery of a vertical alignment film 26b is provided on a CF substrate 17. A fluorine member 41 of an oil repellent resin is coated and formed on a non-display part between the BM 44 and the seal member 42.

In this state, the liquid crystal is injected through a liquid crystal injection port 12 provided in one side of the seal member 42. At this time, in the non-display part, the liquid crystal is repelled by the fluorine member 41 so that the liquid crystal molecules are brought into a pseudo vertical alignment, and the liquid crystal injection is performed in a state where the liquid crystal molecules are vertically aligned over substantially the whole surface. Accordingly, in this case, the difference in liquid crystal injection speed as described above does not occurs, the liquid crystal layer 6 is formed at a uniform injection speed, and the occurrence of the irregular black due to the difference in liquid crystal injection speed is suppressed.

As described above, according to the liquid crystal display device of this example, the aperture ratio can be easily and certainly improved without causing defects such as an uneven display, and the liquid crystal display having high reliability can be realized.

Example 2-4

FIGS. 14A to 14C are schematic views showing a state at the time of formation of a liquid crystal layer of a liquid crystal display device according to example 2-4 of this embodiment. FIG. 14A is a plan view, FIG. 14B is a sectional view taken along a short side, and FIG. 14C is a sectional view taken along a long side.

In this liquid crystal display device, a seal member 42 surrounding a vertical alignment film 26a is provided on a TFT substrate 16, and a BM 44 covering the periphery of a vertical alignment film 26b is provided on a CF substrate 17.

Then, at a short side part in the drawing, that is, at a part opposite to a liquid crystal injection port 12 in parts parallel to the liquid crystal injection port 12, a non-display part is formed to be wide (wide region 46) even when a comparison with FIGS. 7A and 7B is made. Further, at a long side part in the drawing (part orthogonal to the liquid crystal injection port 12) and a short side part at the side of the liquid crystal injection port 12, the seal member 42 is disposed adjacent to the vertical alignment film 26a, and a non-display part of a region between the BM 44 and the seal member 42 is made very narrow (there is also a case where they are made to almost coincide with each other). It is preferable that the width of this non-display part is made, for example, 0.5 mm or less.

In this state, the liquid crystal is injected through the liquid crystal injection port 12 provided in one side of the seal member 42. At this time, a liquid crystal in which the concentration of a monomer is low is confined in the wide region 46 most distant from the liquid crystal injection port 12, and a retention region is locally formed. On the other hand, the non-display part hardly exists in the part other than the part opposite to the liquid crystal injection port 12, and the vertical alignment films 26a and 26b cover the inside region of the seal member 42, so that the liquid crystal molecules are regulated by these over the whole surface, and the liquid crystal injection is performed in the state of vertical alignment. Accordingly, in this case, the liquid crystal in the wide region 46 does not have a bad influence, the difference in liquid crystal injection speed as described above does not occur, the liquid crystal layer 6 is formed at a uniform injection speed, and the occurrence of the irregular black due to the difference in liquid crystal injection speed can be suppressed.

According to the liquid crystal display device of this example, the aperture ratio can be easily and certainly improved without causing defects such as an uneven display, and the liquid crystal display having high reliability can be realized.

As described above, according to this embodiment, the aperture ratio can be easily and certainly improved without causing defects such as an uneven display and the liquid crystal display having high reliability can be realized.

Third Embodiment

Next, a liquid crystal display device according to a third embodiment of the invention and a manufacturing method thereof will be described. First, the principle of this embodiment will be described.

As a result of an earnest study of the cause of occurrence of an uneven display, the present inventor has found that the cause relates to the fact that when a liquid crystal is injected into a liquid crystal cell by a vacuum injection method, an injection speed of the liquid crystal in the vicinity of a seal member is higher than an injection speed of the liquid crystal in a display region.

Figure 15A:
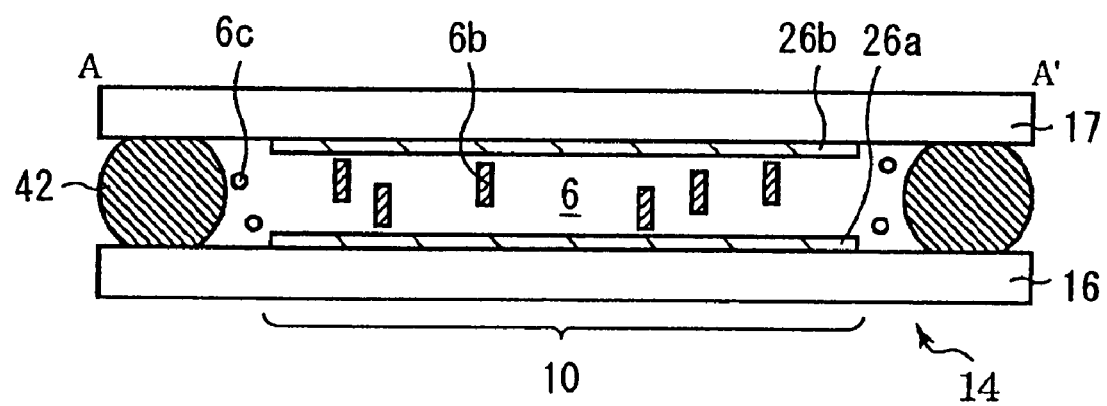
FIGS. 15A and 15B are schematic views showing a vertical alignment type liquid crystal display device.
Figure 15B:
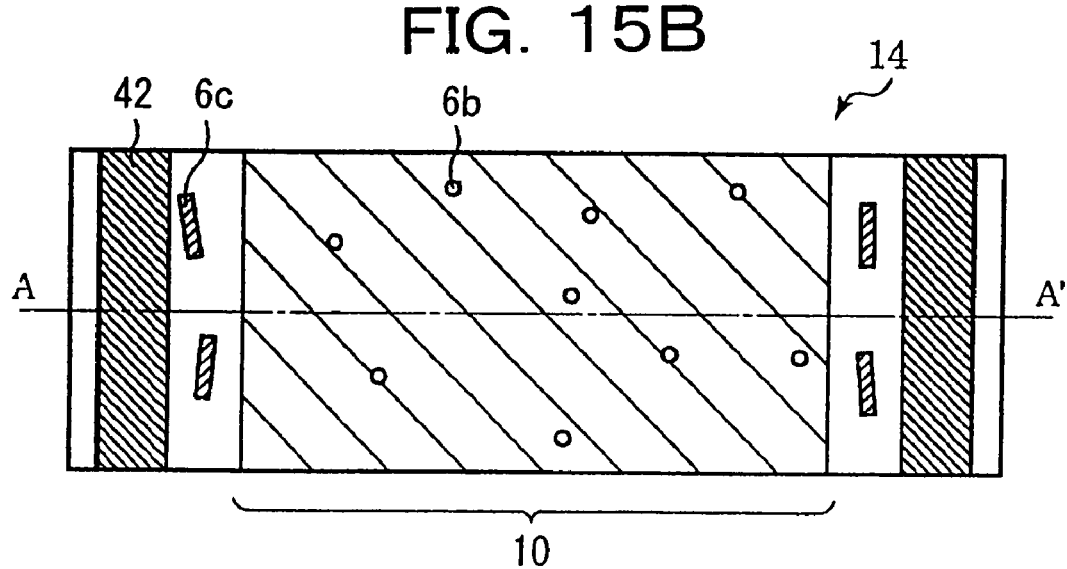

FIGS. 15A and 15B are schematic views showing a vertical alignment type liquid crystal display device. FIG. 15B is a plan view showing a part of the liquid crystal display device, and FIG. 15A is a sectional view taken along line A-A' of FIG. 15B. Incidentally, here, a spacer is not illustrated.

As shown in FIGS. 15A and 15B, a seal member 42 is provided at the peripheries of a pair of substrates 16 and 17 arranged to be opposite to each other. Alignment films 26a and 26b for making liquid crystal molecules vertically aligned are provided on the opposite surfaces of the substrates 16 and 17.

Figure 16A:
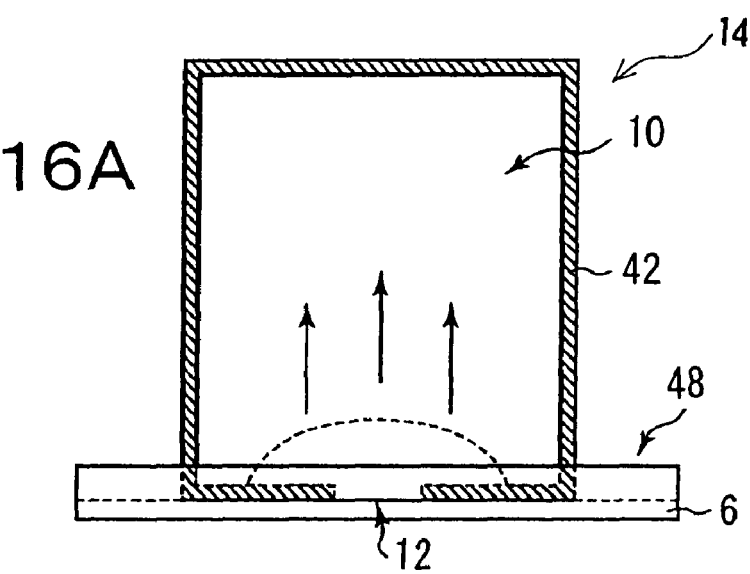
FIGS. 16A to 16C are conceptual views (No. 1) expressing a state in which a liquid crystal is injected.
Figure 16B:
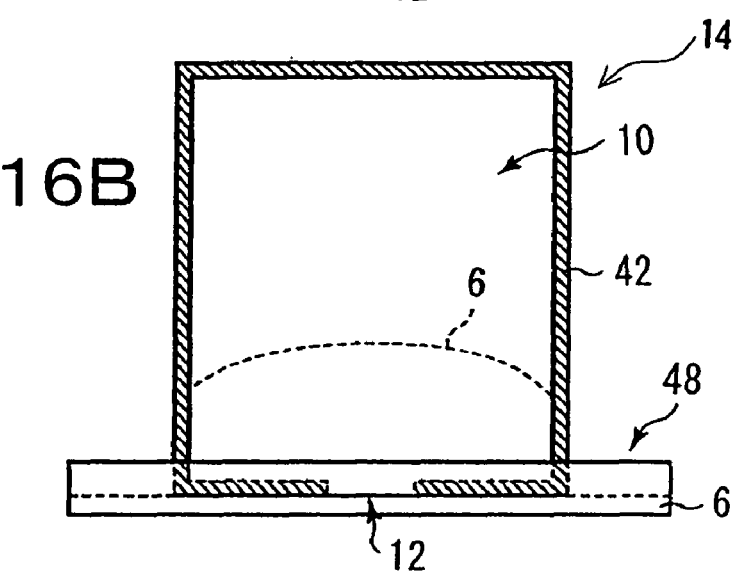
Figure 16C:
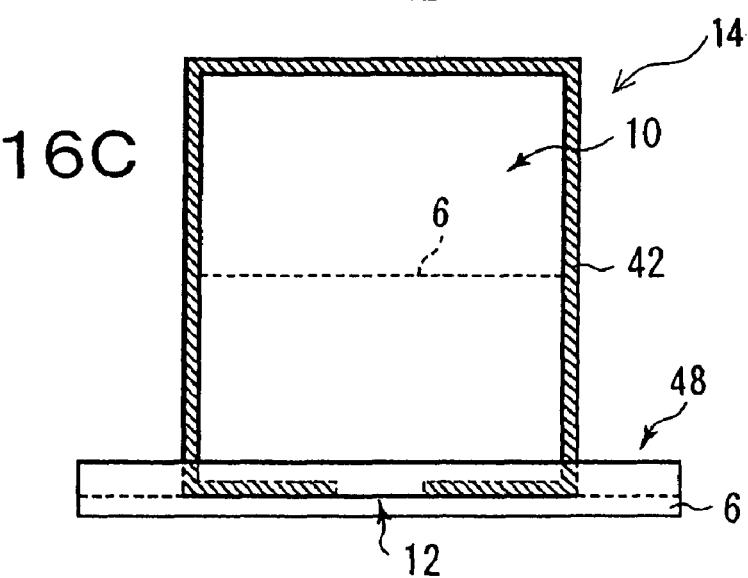

When a liquid crystal 6 having a negative dielectric anisotropy is injected into a liquid crystal cell 14 like this, in the region where the alignment films 26a and 26b are provided, a liquid crystal molecule 6b is vertically aligned by the alignment films 26a and 26b, and advances toward the opposite side of the liquid crystal injection port 12 (see FIG. 16A).

On the other hand, in the vicinity of the seal member 42, since the alignment films 26a and 26b are not provided, the alignment direction of a liquid crystal molecule 6c becomes almost horizontal to the substrates 16 and 17.

The liquid crystal molecule 6b vertically aligned has a tendency that the injection speed is low as compared with the liquid crystal molecule 6c having the horizontal alignment direction. Thus, when the liquid crystal 6 is injected into the liquid crystal cell 14 by the vacuum injection method, the liquid crystal 6 is not injected into the liquid crystal cell 14 at a uniform speed totally, but the liquid crystal 6 is injected at a high speed in the vicinity of the seal member 42, and the liquid crystal 6 is injected at a relatively low speed in a display region 10.

FIGS. 16A to 17B are conceptual views showing a state where the liquid crystal is injected.

The inside of the liquid crystal cell 14 is made vacuous, and after the liquid crystal injection port 12 is immersed in a liquid crystal plate 48 storing the liquid crystal 6, the pressure of the inside is returned to the atmospheric pressure. Then, as shown in FIGS. 16A to 17A, the liquid crystal 6 is injected into the inside of the liquid crystal cell 14 through the liquid crystal injection port 12.

Figure 17A:
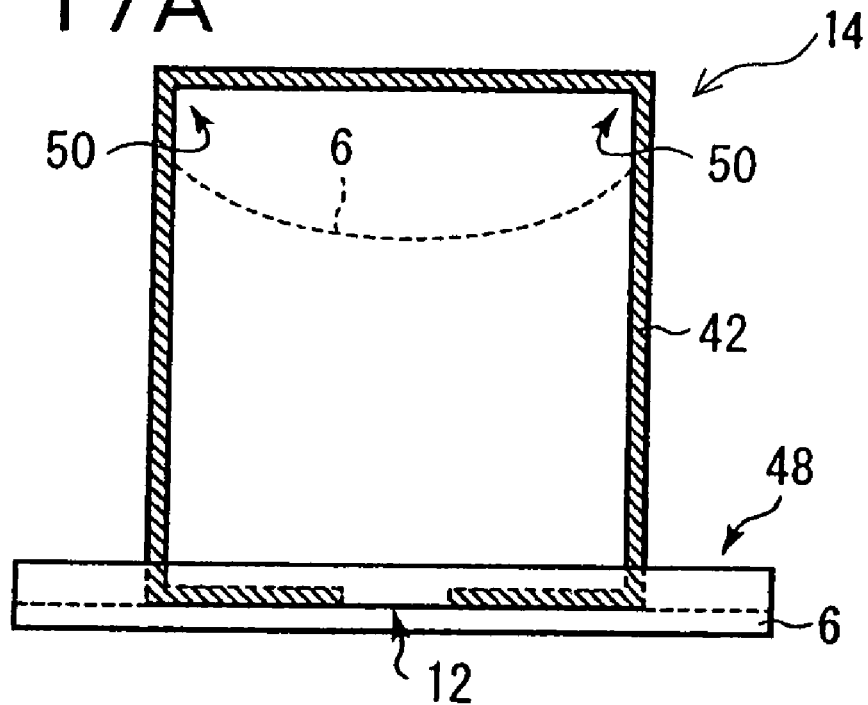
FIGS. 17A and 17B are conceptual views (No. 2) expressing a state in which a liquid crystal is injected.

Since the injection speed of the liquid crystal 6 in the vicinity of the seal member 42 is higher than the injection speed of the liquid crystal 6 in the display region 10, as shown in FIG. 17A, the liquid crystal advancing along the seal member 42 reaches a corner part 50 opposite to the liquid crystal injection port 12 quickly as compared with the liquid crystal 6 advancing in the display region 10.

Figure 17B:
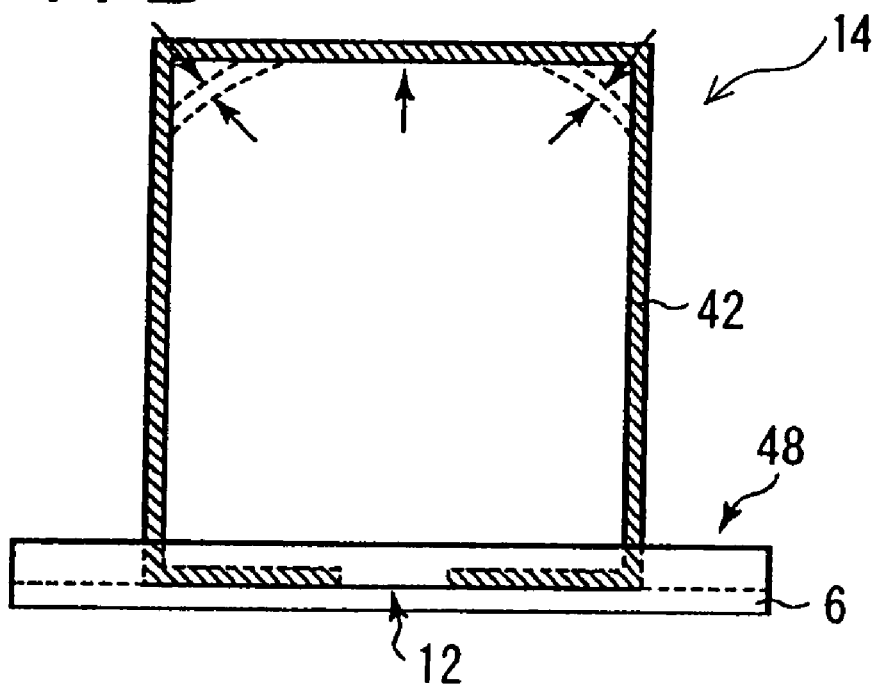

Thus, as shown in FIG. 17B, the liquid crystal 6 quickly advancing along the seal member 42 is turned back by the corner part 50 and collides against the liquid crystal 6 advancing in the display region 10.

According to the study of the present inventor, it has been found that the uneven display is apt to occur at a place where the liquid crystal 6 turned back by the corner part 50 collides against the liquid crystal 6 advancing in the display region 10.

At the place where the uneven display occurs, that is, at the place where the liquid crystal 6 advancing along the seal member 42 at a high speed and turned back by the corner part 50 collides against the liquid crystal 6 advancing in the display region 10 at a relatively low speed, the composition ratio of the liquid crystal 6 varies slightly. Thus, it is conceivable that a difference occurs in electrooptic characteristics (voltage—transmission characteristics), and the uneven display occurs.

Incidentally, in a horizontal alignment type liquid crystal display device, the uneven display hardly occurs.

Figure 18A:
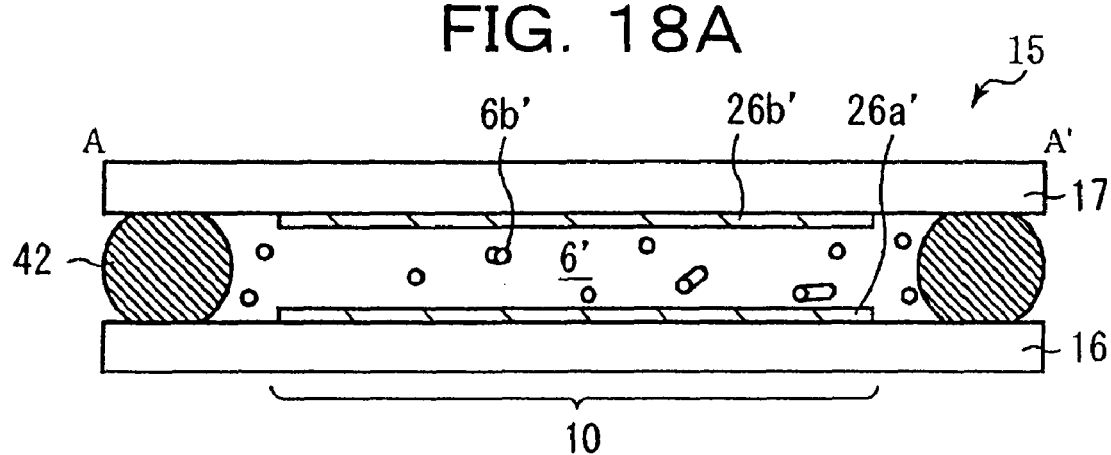
FIGS. 18A and 18B are schematic views showing a horizontal alignment type liquid crystal display device.
Figure 18B:
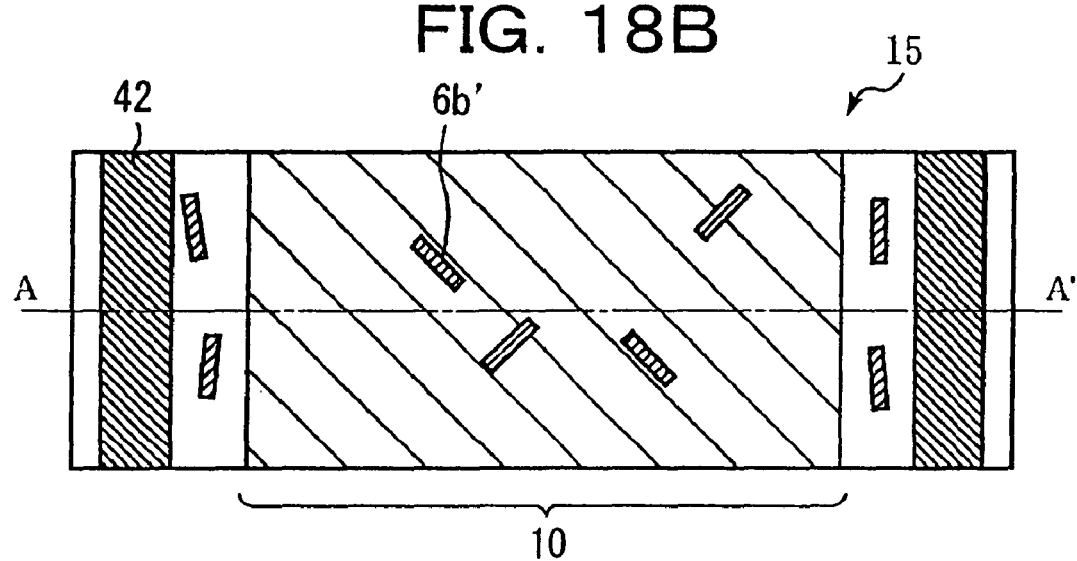

FIGS. 18A and 18B are schematic views showing a horizontal alignment type liquid crystal display device. FIG. 18B is a plan view showing a part of the liquid crystal display device, and FIG. 18A is a sectional view taken along line A-A' of FIG. 18B.

As shown in FIGS. 18A and 18B, alignment films 26a' and 26b' for making a liquid crystal molecule horizontally aligned are provided on the opposite surfaces of substrates 16 and 17.

When a liquid crystal 6' is injected into a liquid crystal cell 15 like this, the alignment directions of liquid crystal molecules 6b' become almost horizontal in both a region where the alignment films 26a' and 26b' are formed and a region where the alignment films 26a' and 26b' are not formed. Since the alignment directions of the liquid crystal molecules 6b' are almost horizontal in any region, the liquid crystal 6' is injected into the liquid crystal cell 15 at an almost uniform speed. Thus, in the case of the horizontal alignment type liquid crystal display device, the phenomenon in which the liquid crystal 6' is turned back by the corner part hardly occurs, and the uneven display does not occur.

Incidentally, one reason why this uneven display does not occur in the horizontal alignment type liquid crystal display device is that the selectivity of materials in the horizontal alignment type liquid crystal is wider than that in the vertical alignment type liquid crystal, and excellent liquid crystal materials have been developed.

Besides, it is conceivable that a liquid crystal material causes a state where an uneven display is apt to occur especially in a liquid crystal display device of a system in which a pre-tilt angle is given by a polymer structure. Especially, it is conceivable that an influence is caused by the fact that a polymerizable component capable of being polymerized by light or heat is contained in a liquid crystal.

From the result of the study like this, the present inventor has conceived that if the injection speed of the liquid crystal 6 in the vicinity of the seal member 42 is made low, it is possible to prevent the liquid crystal 6 advancing in the vicinity of the seal member 42 from colliding against the liquid crystal 6 advancing in the display region 10, it is possible to prevent the formation of a place where the composition of the liquid crystal material becomes irregular, and the uneven display can be suppressed.

Example 3-1

Figure 19A:
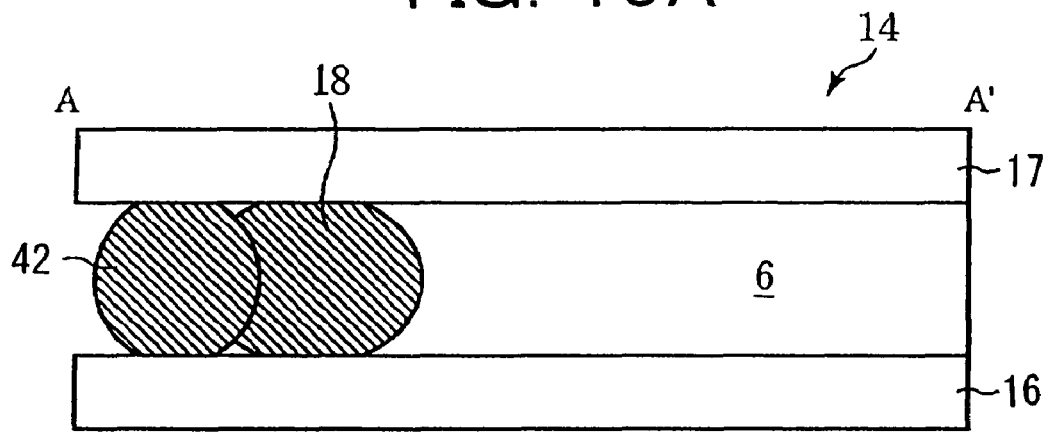
FIGS. 19A and 19B are schematic views showing a liquid crystal display device according to example 3-1 of a third embodiment of the invention.
Figure 19B:
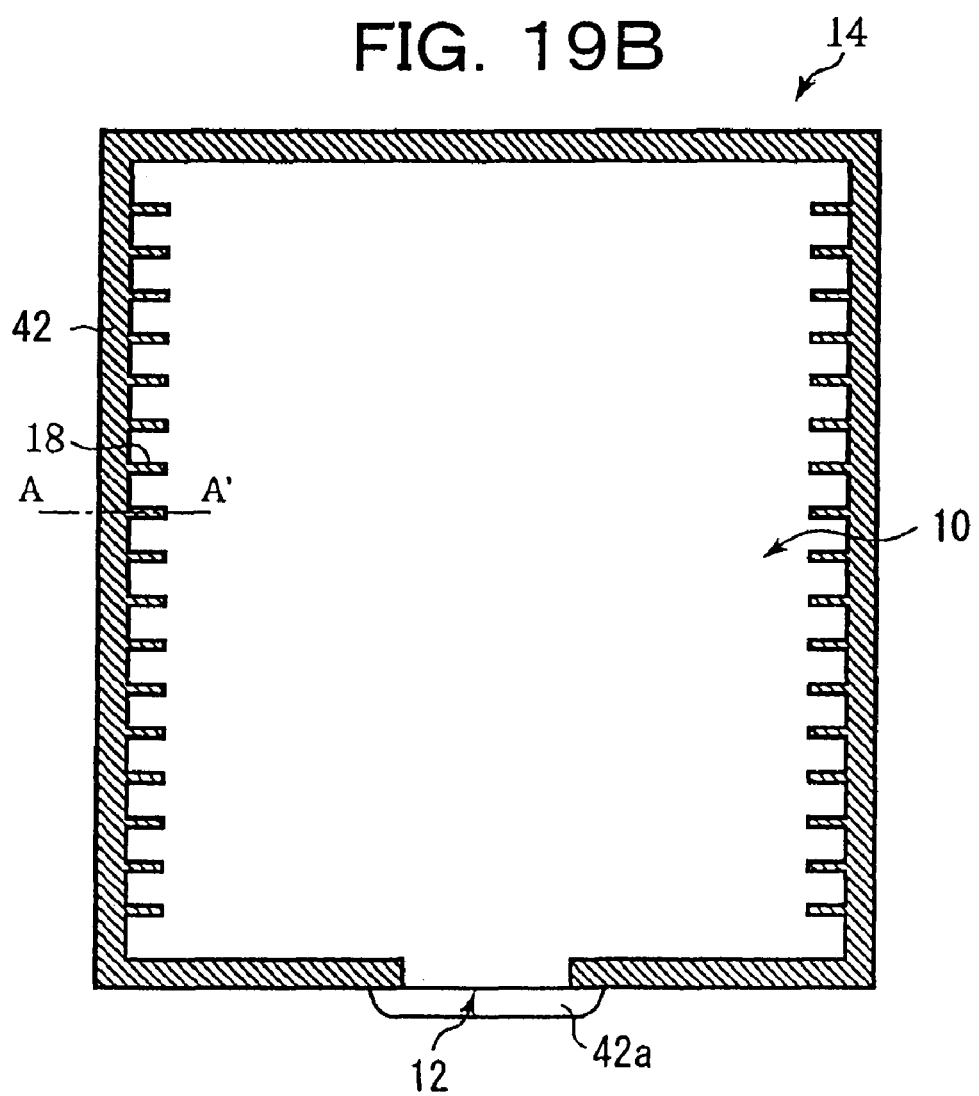

A liquid crystal display device according to example 3-1 of this embodiment and a manufacturing method thereof will be described by using FIGS. 19A to 20D. FIGS. 19A and 19B are schematic views showing the liquid crystal display device according to this example. FIG. 19B is a plan view showing the liquid crystal display device according to this example, and FIG. 19A is a sectional view taken along line A-A' of FIG. 19B.

A TFT (not shown), a drain bus line (not shown), a gate bus line (not shown), a pixel electrode (not shown) and the like are formed on a substrate 16. As the substrate 16, for example, a glass substrate is used. An alignment film (not shown) for making a liquid crystal molecule vertically aligned is formed on the substrate 16.

A substrate 17 is provided over the substrate 16 to be opposite to the substrate 16. A CF layer (not shown), a common electrode (not shown), and the like are formed on the substrate 17. As the substrate 17, for example, a glass substrate is used. An alignment film (not shown) for making a liquid crystal molecule vertically aligned is formed on the substrate 17.

A seal member 42 for sealing a liquid crystal 6 is provided at peripheral parts of the pair of substrates 16 and 17.

Plural injection delaying structures 18 for slowing the injection speed of the liquid crystal 6 are provided in the vicinity of the seal member 42 at a side along a direction in which the liquid crystal 6 is injected. The injection delaying structures 18 project in the direction almost vertical to the seal member 42. Since the injection delaying structures 18 function as resistors to block the flow of the liquid crystal 6 when the liquid crystal 6 is injected, the injection speed of the liquid crystal 6 becomes low in the vicinity of the seal member 42. Incidentally, the injection delaying structures 18 are integrally formed of the same material as the seal member 42.

A liquid crystal cell 14 is constructed in this way.

The liquid crystal 6 is sealed in the liquid crystal cell 14. A vertical alignment type liquid crystal having a negative dielectric anisotropy is used for the liquid crystal 6. A polymerizable component such as a monomer or an oligomer is contained in the liquid crystal 6. As the polymerizable component, a material polymerized by heat or light is used. The liquid crystal 6 like this is used in order to construct a liquid crystal display device of a system in which a pre-tilt angle is given by a polymer structure. Incidentally, with respect to the details of the monomer or the oligomer used for forming the liquid crystal display device of the system in which the pre-tilt angle is given by the polymer structure, the specification of Japanese Patent Application (Japanese Patent Application No. 2001-98455 and No. 2001-264117) by the present applicants may be referred to.

The liquid crystal injection port 12 is sealed by using a sealing material 42a.

In this way, the liquid crystal display device according to this example is constructed.

Next, the manufacturing method of the liquid crystal display device according to this example will be described with reference to FIGS. 20A to 20D. FIGS. 20A to 20D are schematic views showing the manufacturing method of the liquid crystal display device according to this example.

The liquid crystal display device according to this example can be manufactured by injecting the liquid crystal 6 into the foregoing liquid crystal cell 14 by a vacuum injection method.

Figure 20A:
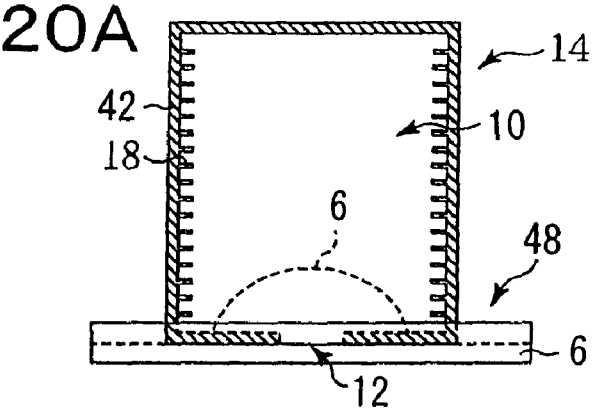
FIGS. 20A to 20D are schematic views showing a manufacturing method of the liquid crystal display device according to the example 3-1 of the third embodiment of the invention.

That is, the inside of the liquid crystal cell 14 is made vacuous, and after the liquid crystal injection port 12 is immersed in a liquid crystal plate 48 storing the liquid crystal 6, the pressure of the inside is returned to the atmospheric pressure. Then, as shown in FIG. 20A, the liquid crystal 6 passes through the liquid crystal injection port 12 and is injected into the inside of the liquid crystal cell 14.

Figure 20B:
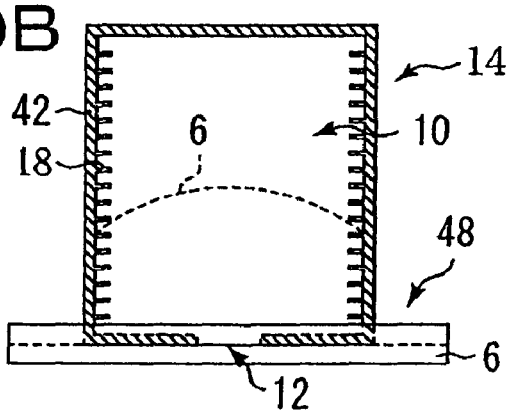
Figure 20C:
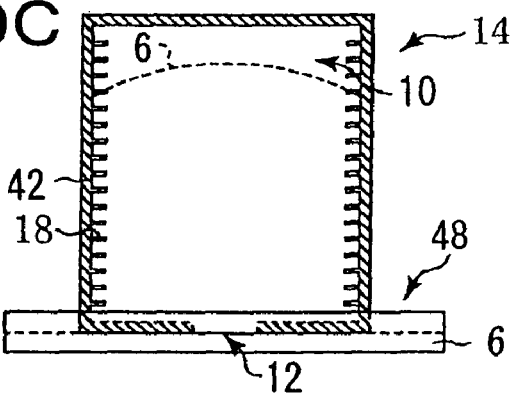

Since the injection delaying structures 18 are provided in the vicinity of the seal member 42, the injection speed of the liquid crystal 6 in the vicinity of the seal member 42 becomes low. On the other hand, since the injection delaying structures 18 are not provided in the display region 10, the liquid crystal 6 is injected into the display region 10 at a relatively high speed (FIGS. 20B and 20C).

Figure 20D:
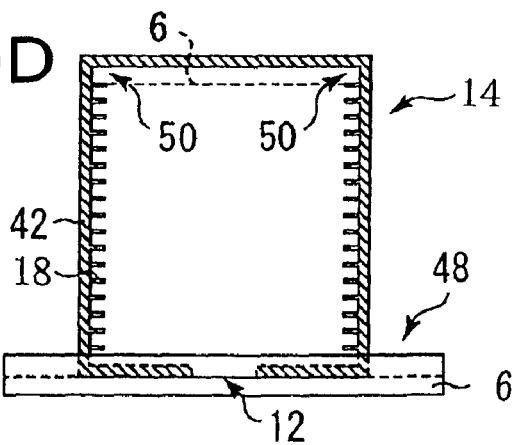

Then, the liquid crystal 6 is not turned back by the corner part 50 of the liquid crystal cell 14, but is injected in the whole liquid crystal cell 14 (FIG. 20D).

In this way, the liquid crystal display device of this example is manufactured.

As described above, according to this example, since the injection delaying structures 18 for slowing the injection speed of the liquid crystal 6 are provided in the vicinity of the seal member 42, the injection speed of the liquid crystal 6 in the vicinity of the seal member 42 can be made low. Thus, according to this example, it is possible to prevent the occurrence of such a state that the liquid crystal 6 is turned back by the corner part 50 of the liquid crystal cell 14, and the liquid crystal 6 turned back by the corner part 50 collides against the liquid crystal 6 advancing in the display region 10. Therefore, according to this example, it is possible to prevent the formation of a place where the composition of the liquid crystal 6 is irregular, and to provide the liquid crystal display device having a less uneven display.

Modified Example (No. 1) of Example 3-1

Figure 21:
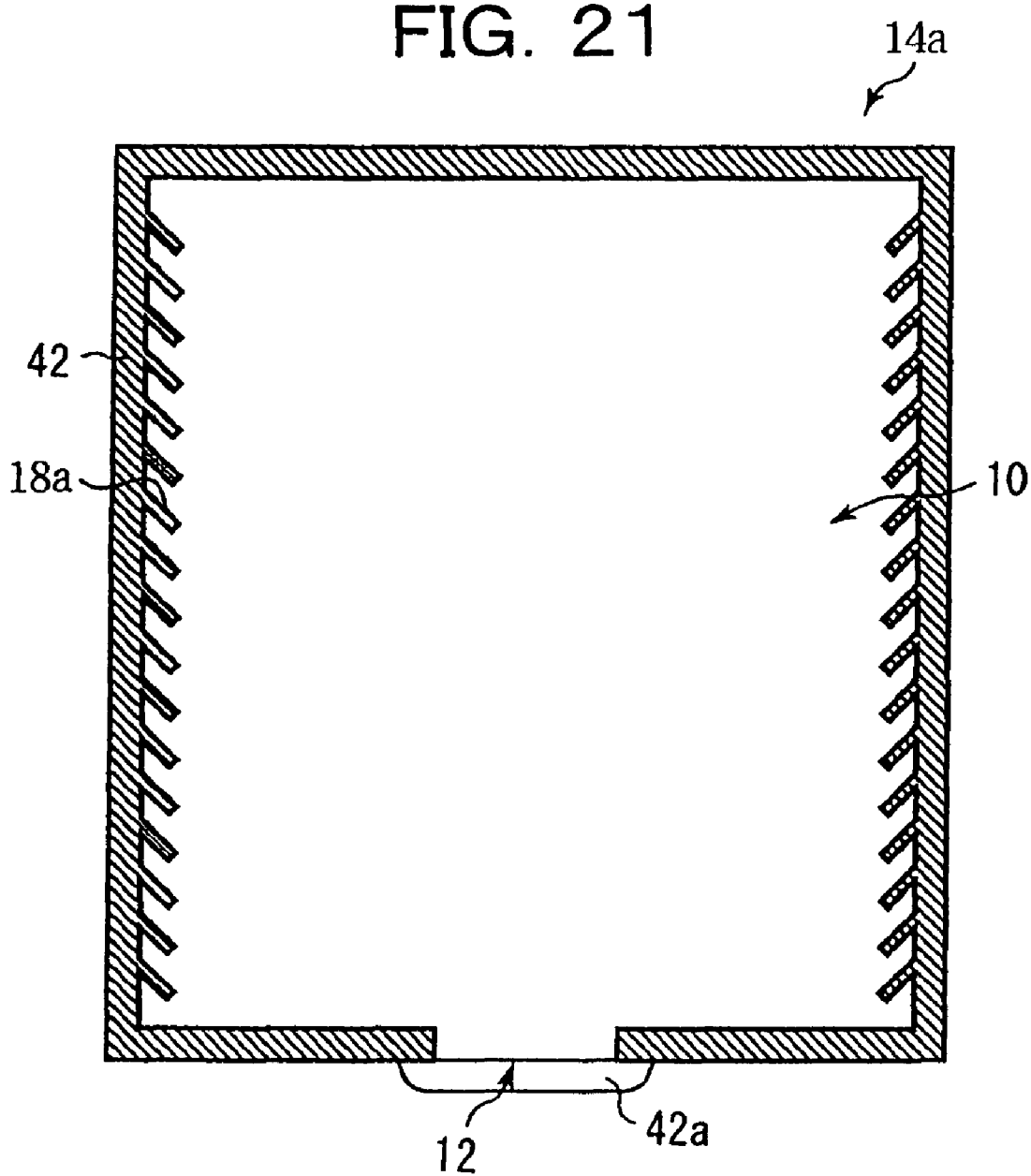
FIG. 21 is a schematic view showing a modified example (No. 1) of the liquid crystal display device according to the example 3-1 of the third embodiment of the invention.
Figure 22A:
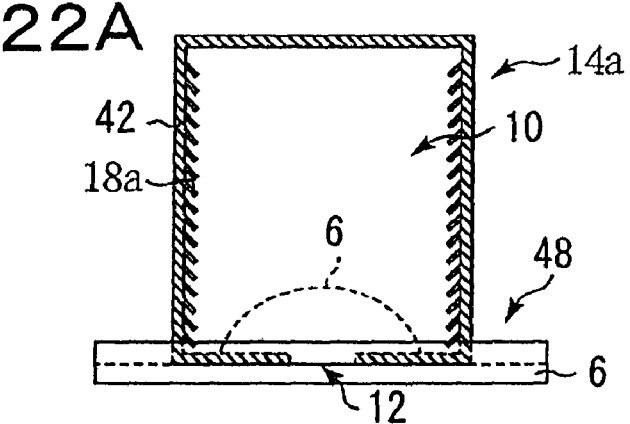
FIGS. 22A to 22D are schematic views showing a modified example (No. 1) of the manufacturing method of the liquid crystal display device according to the example 3-1 of the third embodiment of the invention.
Figure 22B:
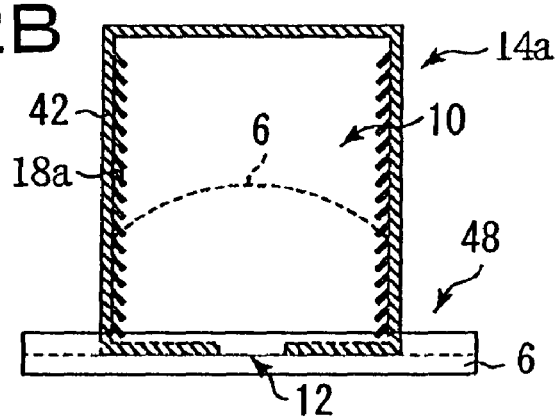
Figure 22C:
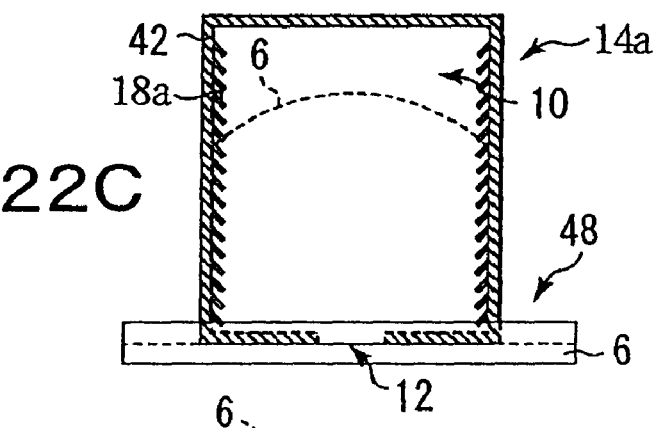
Figure 22D:
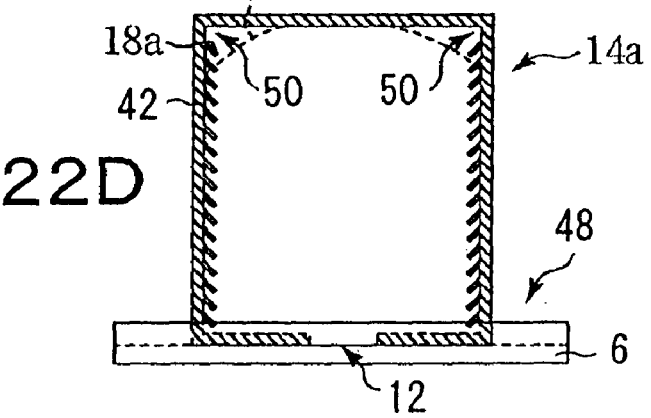

Next, a modified example of the liquid crystal display device and the manufacturing method thereof according to this example will be described with reference to FIGS. 21 to 22D. FIG. 21 is a schematic view showing a liquid crystal display device according to this modified example. FIGS. 22A to 22D are schematic views showing a manufacturing method of the liquid crystal display device according to this modified example.

First, the liquid crystal display device according to this modified example will be described with reference to FIG. 21.

The liquid crystal display device according to this example has a main feature that the projection directions of injection delaying structures 18a for slowing the injection seed of the liquid crystal 6 are inclined to the side of the liquid crystal injection port 12.

As shown in FIG. 21, in this modified example, the projection directions of the injection delaying structures 18a are inclined to the side of the liquid crystal injection port 12. That is, the projection directions of the injection delaying structures 18a are inclined in the direction opposite to the direction in which the liquid crystal 6 is injected. The injection delaying structures 18a are integrally formed of the same material as the seal member 42.

Incidentally, here, the description has been given of the case where the same material as the seal member 42 is used as the material of the injection delaying structures 18a, and the injection delaying structures 18a are formed integrally with the seal member 42, the injection delaying structures 18a may be formed by using a material different from the seal member 42.

In this way, a liquid crystal cell 14a is constructed.

The liquid crystal 6 is sealed in the liquid crystal cell 14a. The liquid crystal injection port 12 is sealed by using a sealing material 42a.

In this way, the liquid crystal display device according to this modified example is constructed.

According to this modified example, since the projection directions of the injection delaying structures 18a are inclined to the side of the liquid crystal injection port 12, the injection delaying structures 18a function further powerfully as resistors to block the flow of the liquid crystal 6 when the liquid crystal 6 is injected. Thus, according to this modified example, the injection speed of the liquid crystal 6 in the vicinity of the seal member 42 can be made to further decrease.

Besides, according to this modified example, since the injection delaying structures 18a function further powerfully as the resistors to block the flow of the liquid crystal 6, even in the case where the number of the provided injection delaying structures 18a is few, it becomes possible to slow the injection speed of the liquid crystal 6 in the vicinity of the seal member 42.

Next, the manufacturing method of the liquid crystal display device according to this modified example will be described with reference to FIGS. 22A to 22D.

The liquid crystal display device according to this modified example can be manufactured by injecting the liquid crystal 6 into the liquid crystal cell 14a by a vacuum injection method.

That is, the inside of the liquid crystal cell 14a is made vacuous, and after the liquid crystal injection port 12 is immersed in a liquid crystal plate 48 storing the liquid crystal 6, the pressure of the inside is returned to the atmospheric pressure. Then, as shown in FIG. 22A, the liquid crystal 6 passes through the liquid crystal injection port 12 and is injected into the inside of the liquid crystal cell 14a.

Since the injection delaying structures 18a are provided in the vicinity of the seal member 42, the injection speed of the liquid crystal 6 in the vicinity of the seal member 42 becomes lower than that in the case of the manufacturing method of the liquid crystal display device shown in FIGS. 20A to 20D. On the other hand, since the injection delaying structures 18a are not provided in the display region 10, the liquid crystal 6 is injected in the display region 10 at a relatively high speed (see FIGS. 22B and 22C).

Then, the liquid crystal 6 is not turned back by the corner part 50 of the liquid crystal cell 14a, but is injected in the whole liquid crystal cell 14a (see FIG. 22D).

In this way, the liquid crystal display device according to this modified example is manufactured.

As stated above, the projection directions of the injection delaying structures 18a may be inclined to the side of the liquid crystal injection port 12.

Modified Example (No. 2) of Example 3-1

Figure 23:
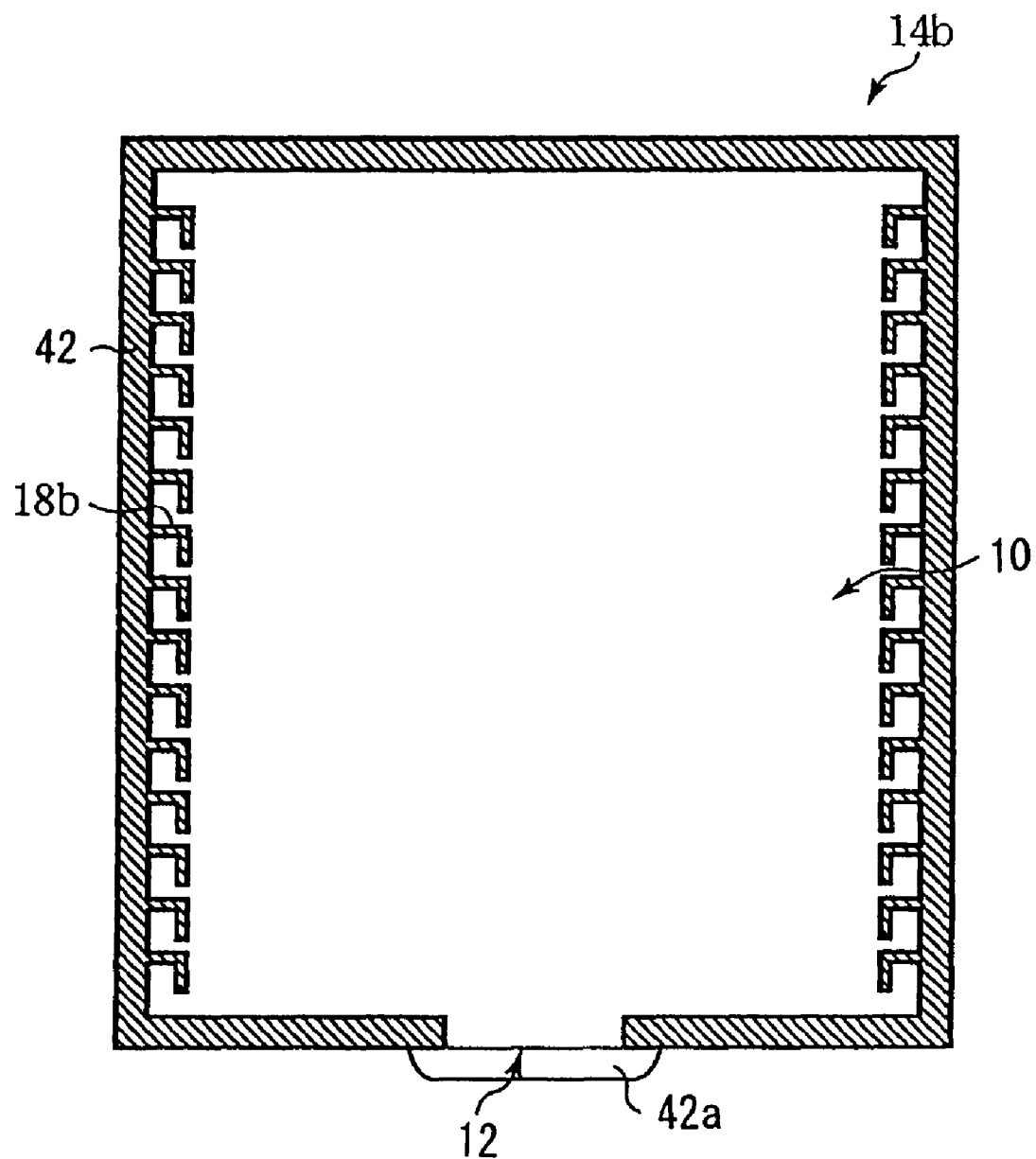
FIG. 23 is a schematic view showing a modified example (No. 2) of the liquid crystal display device according to the example 3-1 of the third embodiment of the invention.

Next, a modified example (No. 2) of the liquid crystal display device according to this example will be described with reference to FIG. 23. FIG. 23 is a plan view showing a liquid crystal display device according to this modified example.

The liquid crystal display device according to this modified example has a main feature that the shape of each of injection delaying structures 18b is key-shaped.

As shown in FIG. 23, in this modified example, the projection direction of each of the injection delaying structures 18b is bent toward the side of the liquid crystal injection port 12. That is, in this modified example, each of the injection delaying structures 18b is bent toward the direction opposite to the injection direction of the liquid crystal 6. The injection delaying structures 18b are integrally formed by using the same material as the seal member 42.

Incidentally, here, although the description has been given of the case where the same material as the seal member 42 is used as the material of the injection delaying structures 18b, and the injection delaying structures 18b are formed integrally with the seal member 42, the injection delaying structures 18b may be formed by using a material different from the seal member 42.

In this way, a liquid crystal cell 14b is constructed.

The liquid crystal 6 is sealed in the liquid crystal cell 14b. The liquid crystal injection port 12 is sealed by using a sealing material 42a.

In this way, the liquid crystal display device according to this modified example is constructed.

According to this modified example, since each of the injection delaying structures 18b is bent toward the side of the liquid crystal injection port 12, the injection delaying structures 18b function further powerfully as resistors to block the flow of the liquid crystal 6 when the liquid crystal 6 is injected. Thus, according to this modified example, the injection speed of the liquid crystal 6 in the vicinity of the seal member 42 can be made to further decrease.

Besides, according to this modified example, even in the case where the number of the provided injection delaying structures 18b is fewer, it becomes possible to slow the injection speed of the liquid crystal 6 in the vicinity of the seal member 42.

Modified Example (No. 3) of Example 3-1

Figure 24:
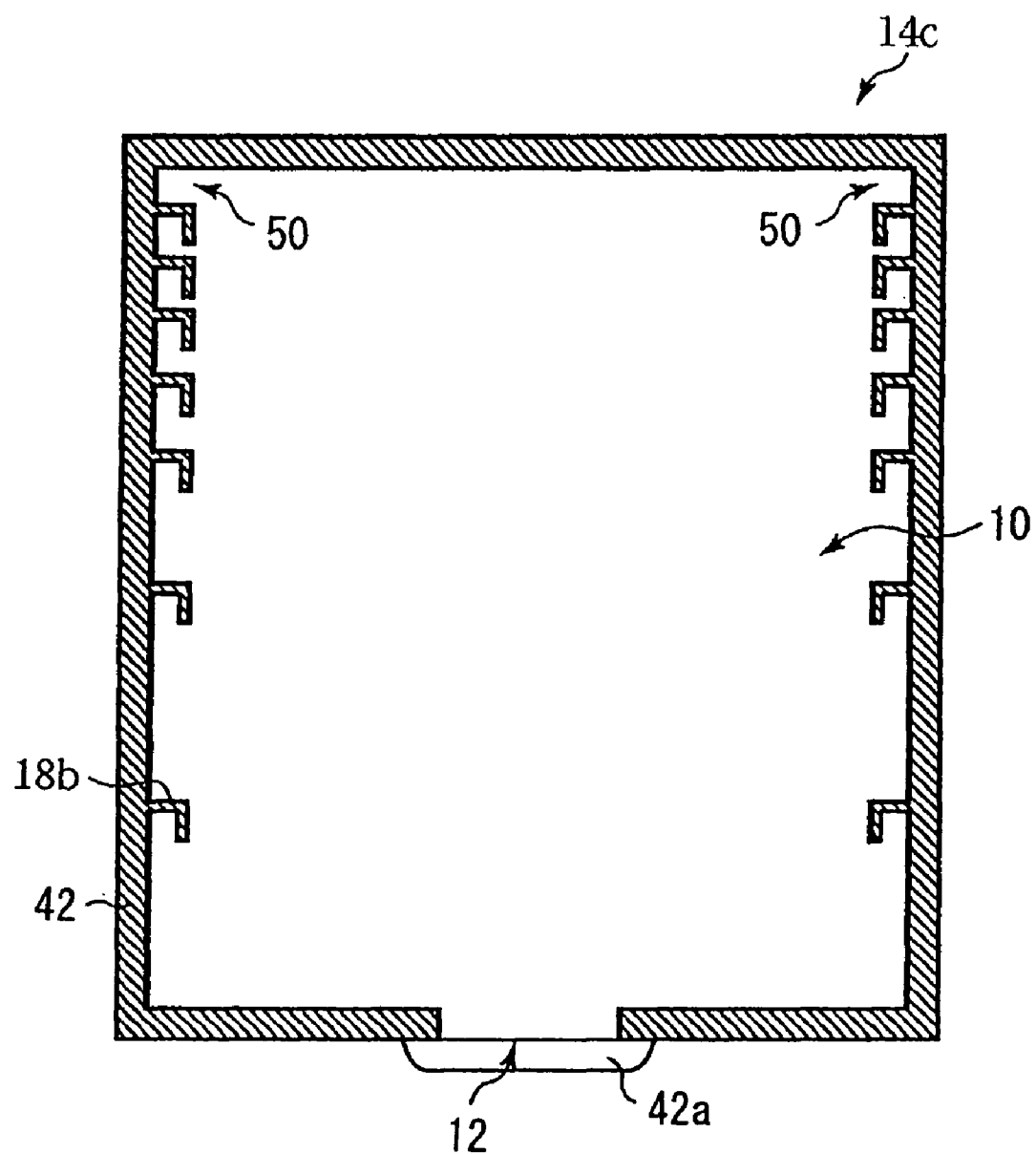
FIG. 24 is a schematic view showing a modified example (No. 3) of the liquid crystal display device according to the example 3-1 of the third embodiment of the invention.
Figure 25A:
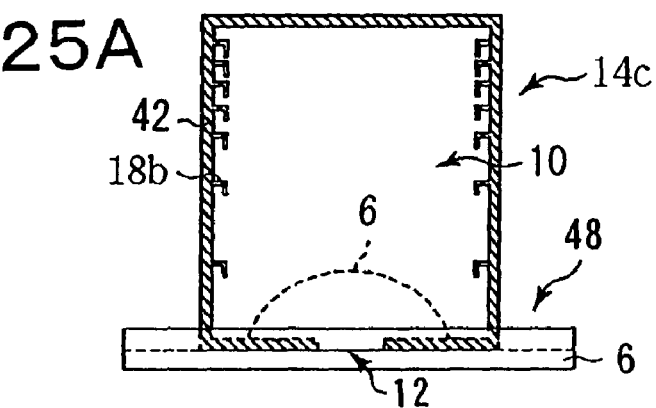
FIGS. 25A to 25D are schematic views showing a modified example (No. 3) of the manufacturing method of the liquid crystal display device according to the example 3-1 of the third embodiment of the invention.

Next, a modified example (No. 3) of the liquid crystal display device and the manufacturing method thereof according to this example will be described with reference to FIGS. 24 to 25D. FIG. 24 is a plan view showing a liquid crystal display device according to this modified example. FIGS. 25A to 25D are schematic views showing a manufacturing method of the liquid crystal display device according to this modified example.

First, the liquid crystal display device according to this modified example will be described with reference to FIG. 24.

The liquid crystal display device according to this modified example has a main feature that injection delaying structures 18b are thickly provided only in the vicinity of a corner part 50 opposite to a liquid crystal injection port 12, and the injection delaying structures 18b are thinly provided at the side of the liquid crystal injection port 12.

As shown in FIG. 24, the injection delaying structures 18b are thickly provided in the vicinity of the corner part 50 opposite to the liquid crystal injection port 12. The injection delaying structures 18b are integrally formed by using the same material as the seal member 42.

Incidentally, here, although the description has been given of the case where the same material as the seal member 42 is used as the material of the injection delaying structures 18b, and the injection delaying structures 18b are formed integrally with the seal member 42, the injection delaying structures 18b may be formed by using a material different from the seal member 42.

On the other hand, the injection delaying structures 18b are thinly provided at the side of the liquid crystal injection port 12.

Since the turn of the liquid crystal 6 is apt to occur at the corner part 50 opposite to the liquid crystal injection port 12, if the injection delaying structures 18b are thickly provided only in the vicinity of the corner part 50 opposite to the liquid crystal injection port 12, it is possible to prevent the liquid crystal 6 from being turned back by the corner part 50.

In this way, a liquid crystal cell 14c is constructed.

The liquid crystal 6 is sealed in the liquid crystal cell 14c. The liquid crystal injection port 12 is sealed by using a sealing material 42a.

In this way, the liquid crystal display device according to this modified example is constructed.

Next, the manufacturing method of the liquid crystal display device according to this modified example will be described with reference to FIGS. 25A to 25D.

The liquid crystal display device according to this modified example can be manufactured by injecting the liquid crystal 6 into the liquid crystal cell 14c by a vacuum injection method.

That is, the inside of the liquid crystal cell 14c is made vacuous, and after the liquid crystal injection port 12 is immersed in a liquid crystal plate 48 storing the liquid crystal 6, the pressure of the inside is returned to the atmospheric pressure. Then, as shown in FIG. 25A, the liquid crystal 6 passes through the liquid crystal injection port 12 and is injected into the inside of the liquid crystal cell 14c.

Figure 25B:
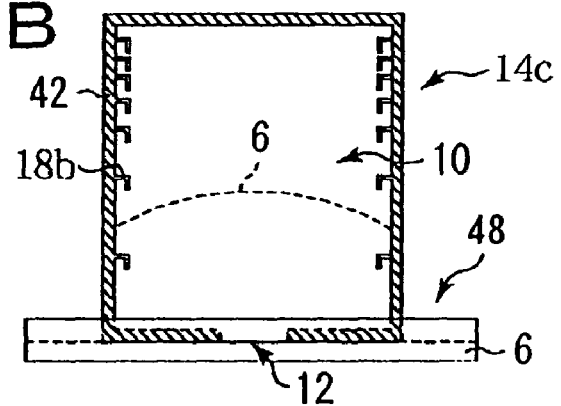
Figure 25C:
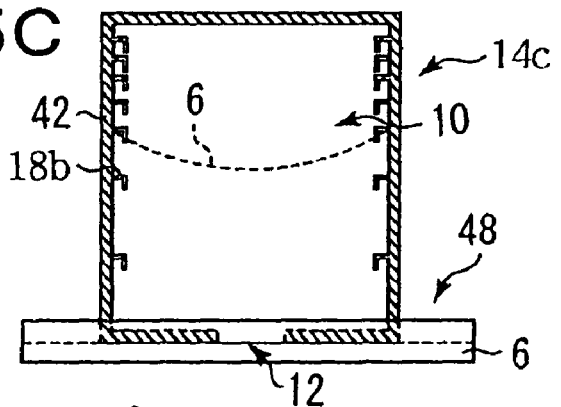
Figure 25D:
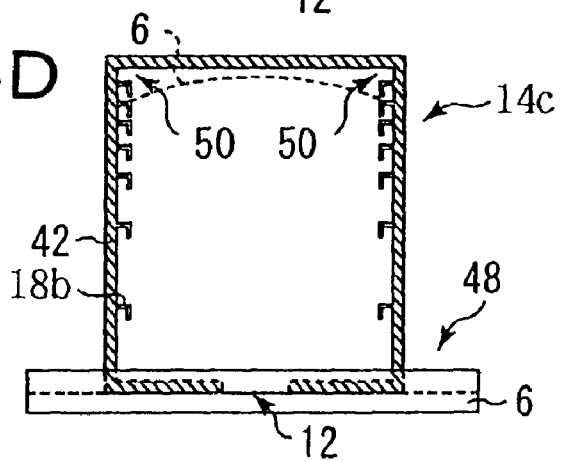

Since the number of the provided injection delaying structures 18b is few at the side of the liquid crystal injection port 12, the injection speed of the liquid crystal 6 in the vicinity of the seal member 42 becomes higher than the injection speed of the liquid crystal 6 in the display region 10 (see FIGS. 25B and 25C).

However, since the injection delaying structures 18c are thickly provided at the side opposite to the liquid crystal injection port 12, at the side opposite to the liquid crystal injection port 12, the injection speed of the liquid crystal 6 in the vicinity of the seal member 42 becomes lower than the injection speed of the liquid crystal 6 in the display region 10.

Then, the liquid crystal 6 is not turned back by the corner part 50 of the liquid crystal cell 14c, but is injected in the whole liquid crystal cell 14c (see FIG. 25D).

In this way, the liquid crystal display device according to this modified example is manufactured.

As stated above, the injection delaying structures 18c may be thickly provided only in the vicinity of the corner part 50 opposite to the liquid crystal injection port 12 and may be thinly provided at the side of the liquid crystal injection port 12. According to this modified example, since it is sufficient if the injection delaying structures 18c are thickly provided only in the vicinity of the corner part 50 at the side opposite to the liquid crystal injection port 12, the degree of freedom in designing can be improved.

Example 3-2

Figure 26:
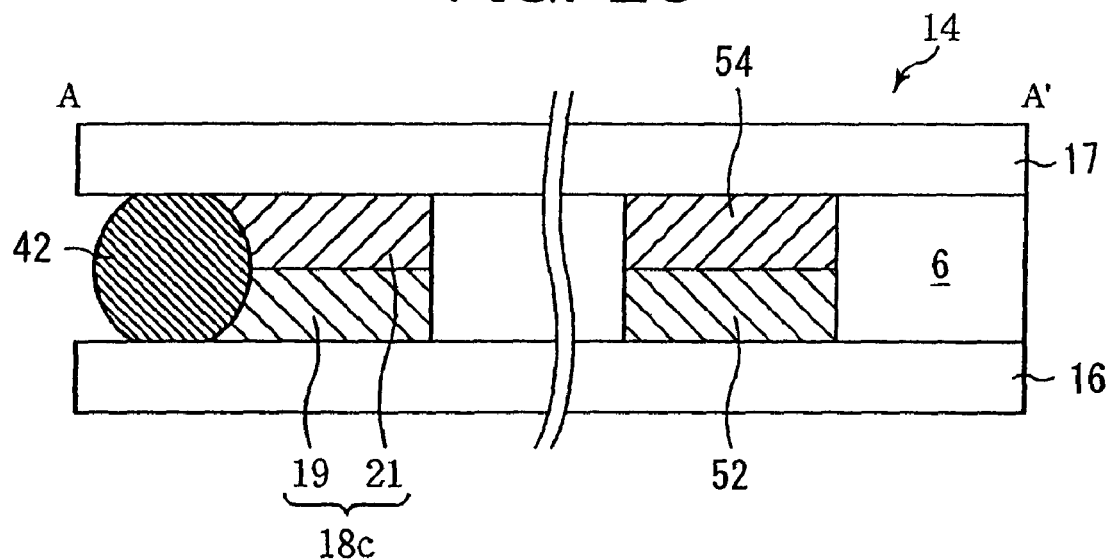
FIG. 26 is a sectional view showing a liquid crystal display device according to example 3-2 of the third embodiment of the invention.

A liquid crystal display device according to example 3-2 of this embodiment will be described with reference to FIG. 26. FIG. 26 is a sectional view showing the liquid crystal display device according to this example. The same structural elements as those of the liquid crystal display device according to the example 3-1 shown in FIGS. 19A to 25D are designated by the same reference symbols and the explanation is omitted or is made in brief.

The liquid crystal display device according to this example has a main feature that structures 19 and 21 are formed on substrates 16 and 17 differently from a seal member 42, and an injection delaying structure 18c is constructed by mutually combining the structures 19 and 21 formed on the respective substrates 16 and 17.

As shown in FIG. 26, a columnar spacer 52 having a height of, for example, 2.0 µm is provided on the substrate 16. The spacer 52 is provided in the ratio of, for example, one to six pixels.

The structure 19 is provided on the substrate 16. The structure 19 is formed by using the same layer as a layer used when the spacer 52 is formed. Thus, the height of the structure 19 is equal to the height of the spacer 52.

A pillar spacer 54 having a height of, for example, 2.0 μm is formed on the substrate 17. When the substrate 16 and the substrate 17 are bonded to each other, the spacer 52 and the spacer 54 are overlapped with each other. The cell thickness is set to, for example, 4.0 μm by these spacers 52 and 54.

The structure 21 is provided on the substrate 17. The structure 21 is constructed by using the same layer as a layer used when the spacer 54 is formed. Thus, the height of the structure 21 is equal to the height of the spacer 54.

When the substrate 16 and the substrate 17 are bonded to each other, the structure 19 and the structure 21 are overlapped with each other. By this, the injection delaying structure 18c is constructed by the structure 19 and the structure 21.

As stated above, the structures 19 and 21 may be formed by using the same layers as the layers used when the spacers 52 and 54 are formed, and the injection delaying structure 18c may be constructed by combining these structures 19 and 21 with each other.

According to this example, since the structures 19 and 21 are formed by using the same layers as the layers used when the spacers 52 and 54 are constructed, the injection delaying structure 18c constructed by combining the structures 19 and 21 not only slows the injection speed of the liquid crystal 6, but also can function as a spacer.

Besides, according to this example, since the structures 19 and 21 are formed by using the same layers as the layers used when the spacers 52 and 54 are formed, the liquid crystal display device having a less uneven display can be provided at low cost without causing the increase of the manufacturing process.

Modified Example of Example 3-2

Figure 27:
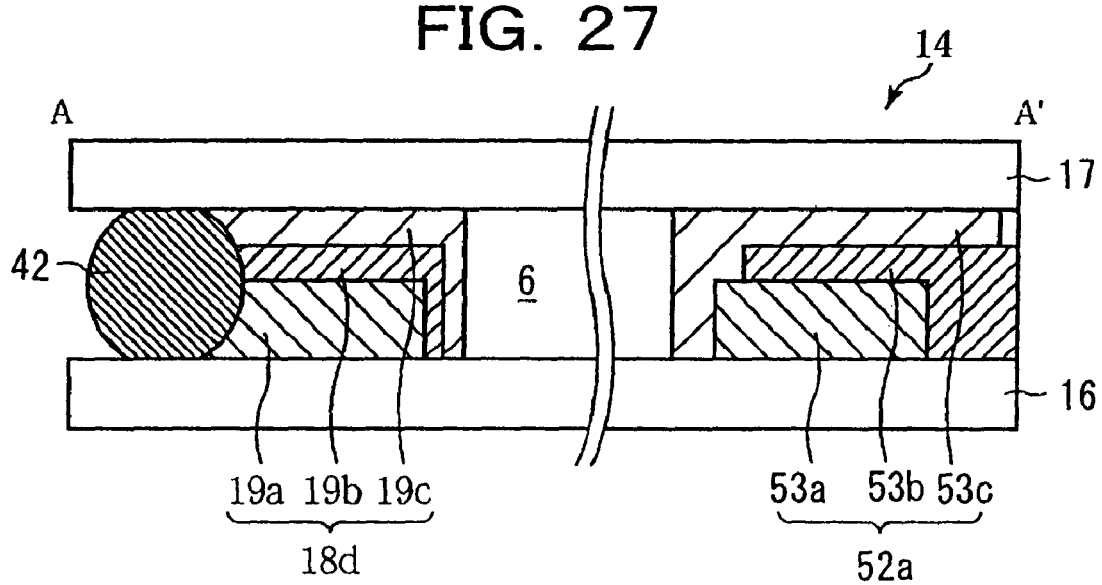
FIG. 27 is a sectional view showing a liquid crystal display device according to a modified example of the example 3-2 of the third embodiment of the invention.

Next, a modified example of the liquid crystal display device according to this example will be described with reference to FIG. 27. FIG. 27 is a sectional view showing a liquid crystal display device according to this modified example.

The liquid crystal display device according to this modified example has a main feature that a laminate structure spacer 52a is formed on a substrate 16, and an injection delaying structure 18d is constituted by using the same laminate film as a laminate film constituting the laminate structure spacer.

As shown in FIG. 27, the laminate structure spacer 52a made of a first spacer layer 53a, a second spacer layer 53b, and a third spacer layer 53c are formed on the substrate 16.

Besides, the laminate structure injection delaying structure 18d made of a first structure layer 19a, a second structure layer 19b, and a third structure layer 19c is formed on the substrate 16 and in the vicinity of a seal member 42. The first structure layer 19a is formed by using the same layer as the layer used when the first spacer layer 53a is formed. The second structure layer 19b is formed by using the same layer as the layer used when the second spacer layer 53b is formed. The third structure layer 19c is formed by using the same layer as the layer used when the third spacer layer 53c is formed. That is, the injection delaying structure 18d is constituted by using the same laminate film as the laminate film used when the laminate structure spacer 52a is formed.

As stated above, the injection delaying structure 18d may be constituted by using the same laminate film as the laminate film used when the laminate structure spacer 52a is formed.

Example 3-3

Figure 28A:
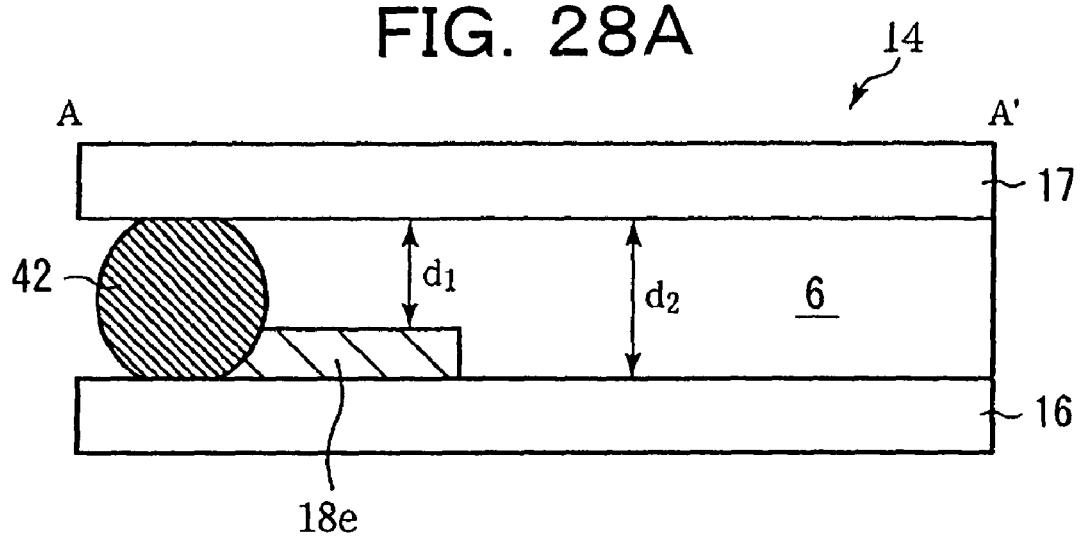
FIGS. 28A and 28B are sectional views showing a liquid crystal display device according to example 3-3 of the third embodiment of the invention.
Figure 28B:
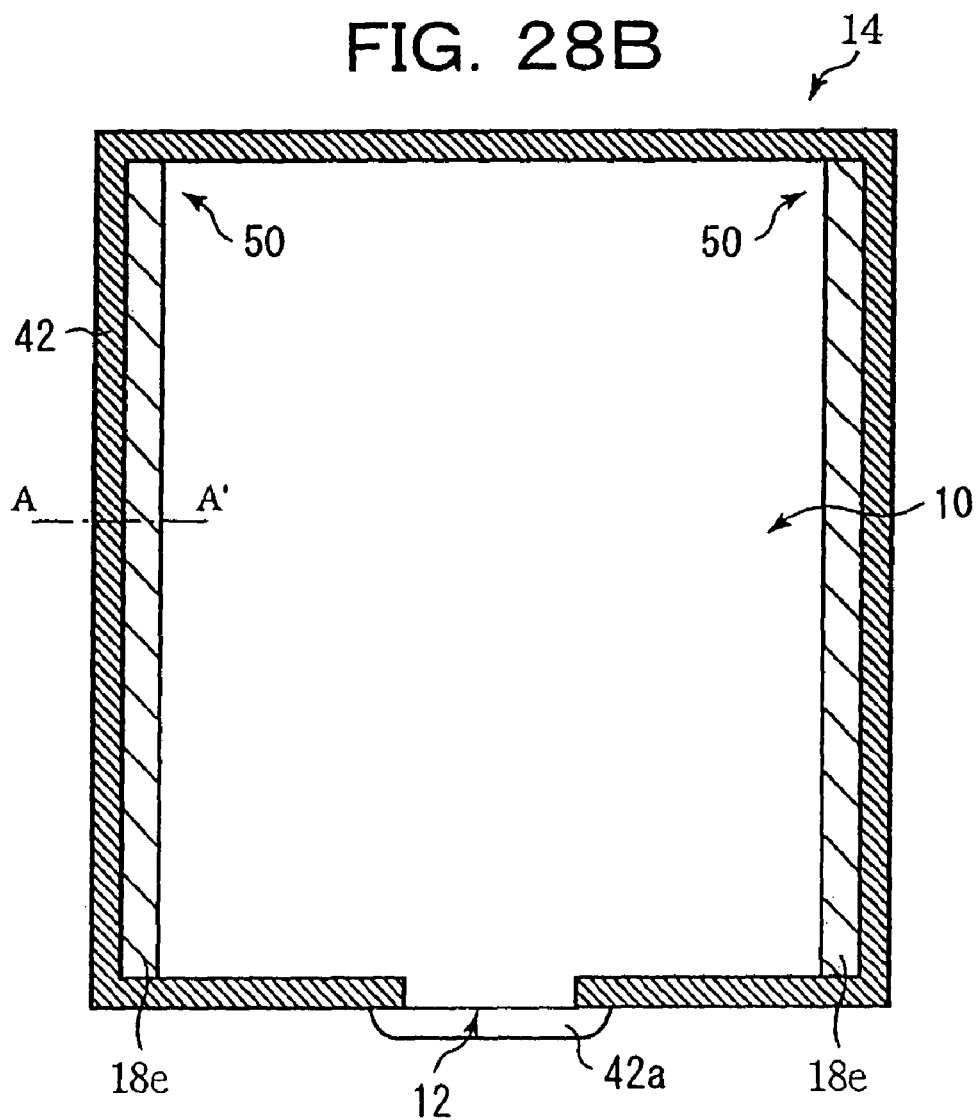

A liquid crystal display device according to example 3-3 of this embodiment will be described with reference to FIGS. 28A and 28B. FIGS. 28A and 28B are schematic views showing the liquid crystal display device according to this example. FIG. 28B is a plan view, and FIG. 28A is a sectional view taken along line A-A' of FIG. 28B. The same structural elements as those of the liquid crystal display device and the manufacturing method thereof according to the examples 3-1 and 3-2 shown in FIGS. 19A to 27 are designated by the same reference symbols and the explanation is omitted or is made in brief.

The liquid crystal display device according to this example has a main feature that a cell thickness $d_1$ in the vicinity of a seal member 42 is made less than a cell thickness $d_2$ in a display region 10, so that the injection speed of a liquid crystal 6 in the vicinity of the seal member 42 is made low.

As shown in FIGS. 28A and 28B, an injection delaying structure 18e having a thickness of, for example, 2.0 μm is formed on a substrate 16. The injection delaying structure 18e is formed into, for example, a plane shape, that is, a mat shape.

Since the injection delaying structure 18e is formed in the vicinity of the seal member 42, the cell thickness $d_1$ in the vicinity of the seal member 42 is less than the cell thickness $d_2$ in the display region 10. Specifically, the cell thickness $d_1$ in the vicinity of the seal member 42 is, for example, 2.0 μm, and the cell thickness $d_2$ in the display region 10 is, for example, 4.0 μm.

As stated above, in this example, since the cell thickness $d_1$ in the vicinity of the seal member 42 is less than the cell thickness $d_2$ in the display region 10, the injection speed of the liquid crystal 6 in the vicinity of the seal member 42 can be made lower than the injection speed of the liquid crystal 6 in the display region 10. Accordingly, also in this example, it is possible to prevent the liquid crystal 6 turned back by the corner part 50 of the liquid crystal cell 14 from colliding against the liquid crystal 6 advancing in the display region 10. Accordingly, also in this example, it is possible to prevent the formation of a place where the composition of the liquid crystal 6 is irregular, and the liquid crystal display device having a less uneven display can be provided.

Modified Example (No. 1) of Example 3-3

Figure 29:
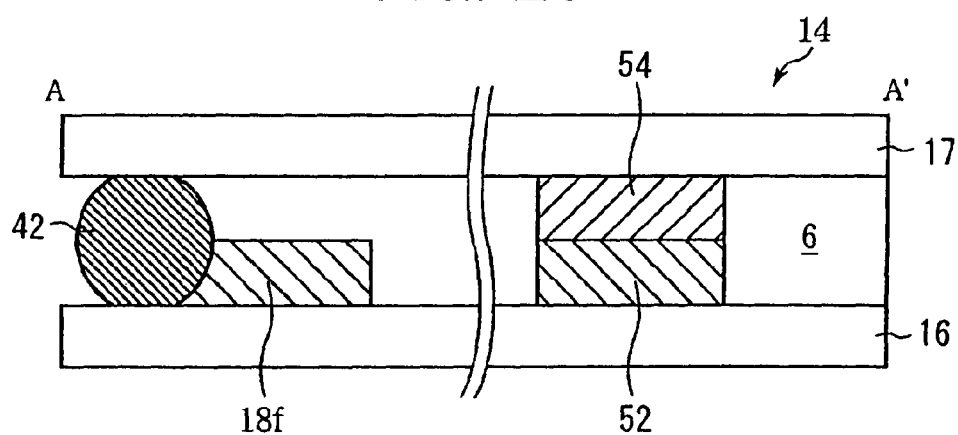
FIG. 29 is a sectional view showing a liquid crystal display device according to a modified example (No. 1) of the example 3-3 of the third embodiment of the invention.

Next, a modified example (No. 1) of the liquid crystal display device according to this example will be described with reference to FIG. 29. FIG. 29 is a sectional view showing a liquid crystal display device according to this modified example.

The liquid crystal display device according to this modified example has a main feature that an injection delaying structure 18f is formed by using the same layer as a layer used when a spacer 52 is formed.

As shown in FIG. 29, the spacer 52 is formed on a substrate 16.

Besides, the injection delaying structure 18f is formed on the substrate 16. The injection delaying structure 18f is formed into a mat shape similarly to the injection delaying structure 18e shown in FIGS. 28A and 28B. The injection delaying structure 18f is formed by using the same layer as the layer used when the spacer 52 is formed. Thus, the height of the injection delaying structure 18f is equal to the height of the spacer 52.

As stated above, the injection delaying structure 18f may be formed of the same layer as the layer used when the spacer 52 is formed.

According to this modified example, since the injection delaying structure 18f is formed by using the same layer as the layer used when the spacer 52 is formed, the liquid crystal display device having a less uneven display can be provided at low cost without causing the increase of the manufacturing process.

Modified Example (No. 2) of Example 3-3

Figure 30:
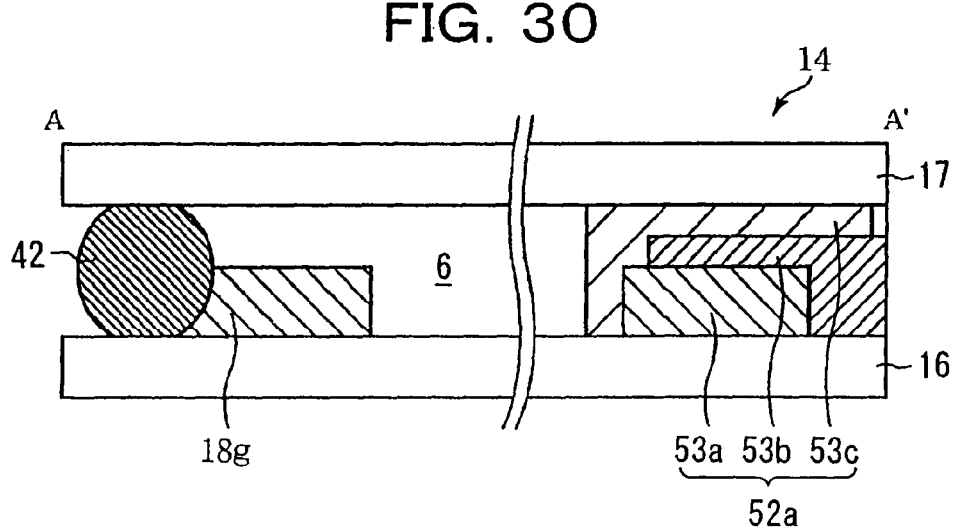
FIG. 30 is a sectional view showing a liquid crystal display device according to a modified example (No. 2) of the example 3-3 of the third embodiment of the invention.

Next, a modified example (No. 2) of the liquid crystal display device according to this example will be described with reference to FIG. 30. FIG. 30 is a sectional view showing a liquid crystal display device according to this modified example.

The liquid crystal display device according to this modified example has a main feature that an injection delaying structure 189 is formed by using the same layer as a first spacer layer 53a constituting a laminate structure spacer 52a.

As shown in FIG. 30, the laminate structure spacer 52a made of the first spacer layer 53a, a second spacer layer 53b, and a third spacer layer 53c is formed on the substrate 16.

Besides, the injection delaying structure 18g is formed on the substrate 16 and in the vicinity of a seal member 42. The injection delaying structure 189 is formed into a mat shape similarly to the injection delaying structure 18e shown in FIGS. 28A and 28B. The injection delaying structure 18g is formed by using the same layer as the layer used when the first spacer layer 53a is formed. Thus, the height of the injection delaying structure 18g is equal to the height of the first spacer 53a.

As stated above, the injection delaying structure 18g may be formed by using the same layer as the layer used when the first spacer 53a constituting the laminate structure spacer is formed.

According to this modified example, since the injection delaying structure 18g is formed by using the same layer as the layer used when the first spacer layer 53a constituting the laminate structure spacer is formed, the liquid crystal display device having a less uneven display can be provided at low cost without causing the increase of the manufacturing process.

Modified Example (No. 3) of Example 3-3

Figure 31:
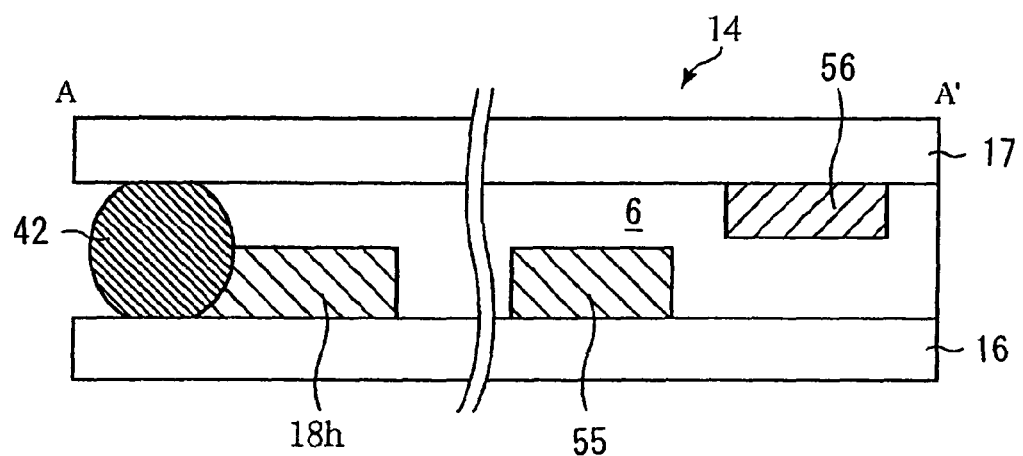
FIG. 31 is a sectional view showing a liquid crystal display device according to a modified example (No. 3) of the example 3-3 of the third embodiment of the invention.

Next, a modified example (No. 3) of the liquid crystal display device according to this example will be described with reference to FIG. 31. FIG. 31 is a sectional view showing a liquid crystal display device according to this modified example.

The liquid crystal display device according to this modified example has a main feature that an injection delaying structure 18h is formed by using the same layer as a layer used when a linear alignment regulating structure 55 is formed.

As shown in FIG. 31, the alignment regulating structure 55 is formed on a substrate 16. The alignment regulating structure 55 is for regulating the alignment direction of a liquid crystal molecule. The alignment regulating structure 55 is formed to be, for example, linear.

Besides, the injection delaying structure 18h is provided on the substrate 16 and in the vicinity of a seal member 42. The injection delaying structure 18h is formed by using the same layer as the layer used when the alignment regulating structure 55 is formed.

An alignment regulating structure 56 is formed on a substrate 17.

In this way, the liquid crystal display device according to this modified example is constructed.

As stated above, the injection delaying structure 18h may be formed by using the same layer as the layer used when the alignment regulating structure 55 is formed.

According to this modified example, since the injection delaying structure 18h is formed by using the same layer as the layer used when the alignment regulating structure 55 is formed, the liquid crystal display device having a less uneven display can be provided at low cost without causing the increase of the manufacturing process.

Modified Example (No. 4) of Example 3-3

Figure 32:
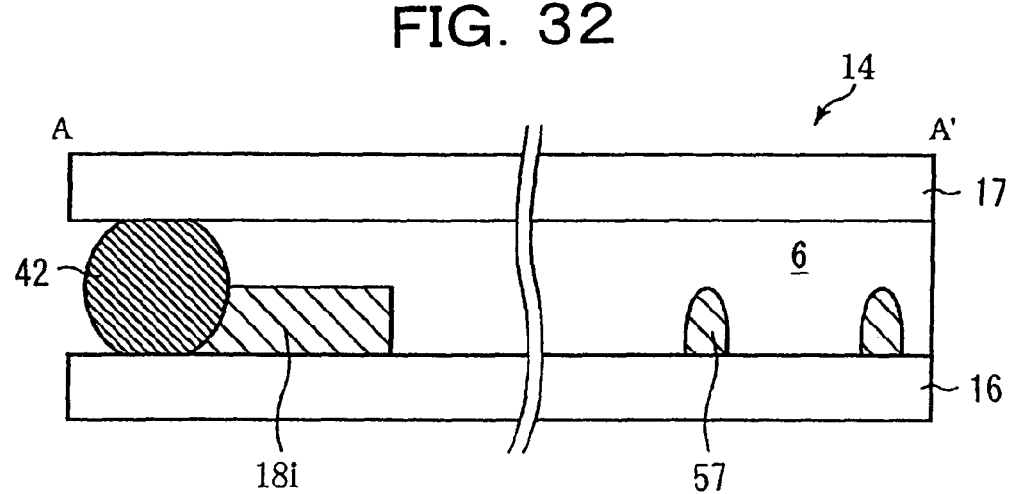
FIG. 32 is a sectional view showing a liquid crystal display device according to a modified example (No. 4) of the example 3-3 of the third embodiment of the invention.

Next, a modified example (No. 4) of the liquid crystal display device according to this example will be described with reference to FIG. 32. FIG. 32 is a sectional view showing a liquid crystal display device according to this modified example.

The liquid crystal display device according to this modified example has a main feature that an injection delaying structure 18i is formed by using the same layer as a layer used when a projection-like alignment regulating structure 57 is formed.

As shown in FIG. 32, the alignment regulating structure 57 is formed on a substrate 16. The alignment regulating structure 57 is for regulating the alignment direction of a liquid crystal molecule. The alignment regulating structure 57 is formed into, for example, a projection form.

Besides, the injection delaying structure 18i is provided in the vicinity of a seal member 42 on the substrate 16. The injection delaying structure 18i is formed by using the same layer as a layer used when the alignment regulating structure 57 is formed.

In this way, the liquid crystal display device according to this modified example is constructed.

As stated above, the injection delaying structure 18i may be formed by using the same layer as the layer used when the alignment regulating structure 57 is formed.

According to this modified example, since the injection delaying structure 18i is formed by using the same layer as the layer used when the alignment regulating structure 57 is formed, the liquid crystal display device having a less uneven display can be provided at low cost without causing the increase of the manufacturing process.

Modified Example (No. 5) of Example 3-3

Figure 33A:
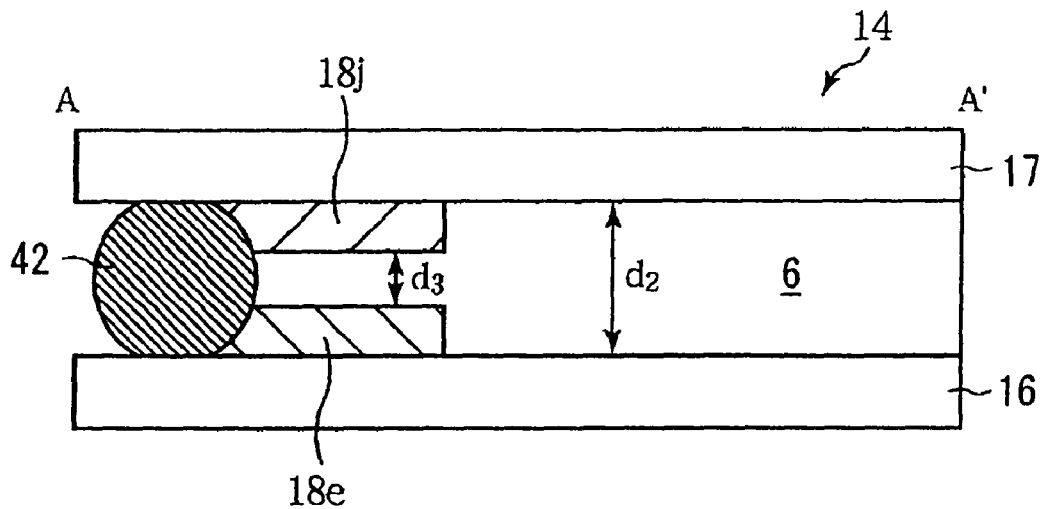
FIGS. 33A and 33B are sectional views showing a liquid crystal display device according to a modified example (No. 5) of the example 3-3 of the third embodiment of the invention.
Figure 33B:
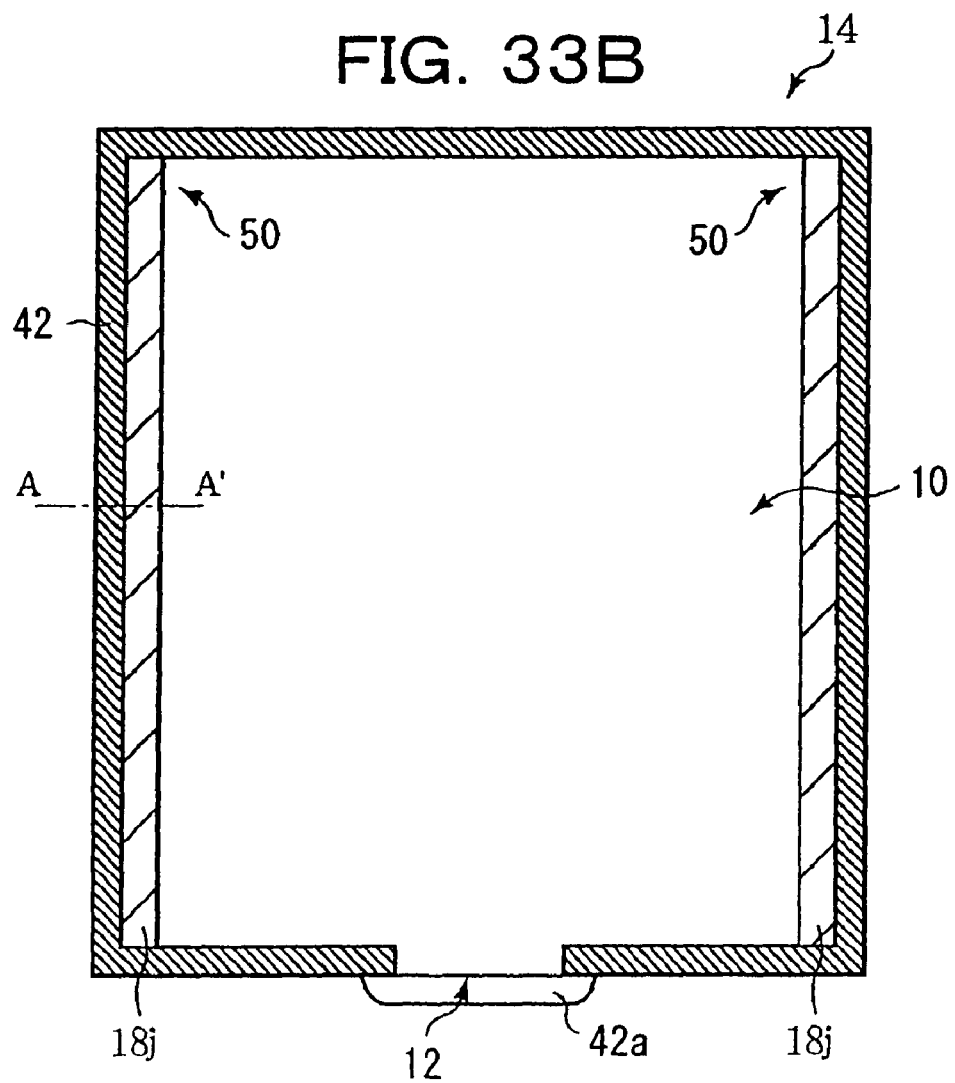

Next, a modified example (No. 5) of the liquid crystal display device according to this example will be described with reference to FIGS. 33A and 33B. FIGS. 33A and 33B are schematic views according to this modified example. FIG. 33B is a plan view, and FIG. 33A is a sectional view taken along line A-A' of FIG. 33B.

The liquid crystal display device according to this modified example has a main feature that in addition to the side of a substrate 16, an injection delaying structure 18j is provided at the side of a substrate 17.

As shown in FIGS. 33A and 33B, an injection delaying structure 18e is provided on the substrate 16 and in the vicinity of a seal member 42.

The injection delaying structure 18j is provided on the substrate 17 and in the vicinity of the seal member 42. The injection delaying structure 18j is also formed into a mat shape similarly to the injection delaying structure 18e.

In this modified example, since the injection delaying structures 18e and 18j are provided on both the substrates 16 and 17, a cell thickness $d_3$ in the vicinity of the seal member 42 can be made less. Accordingly, according to this modified example, the injection speed of the liquid crystal 6 in the vicinity of the seal member 42 can be made further low. Accordingly, according to this modified example, it is possible to further effectively prevent the liquid crystal turned back by the corner part 50 of the liquid crystal cell 14 from colliding against the liquid crystal 6 advancing in the display region 10. Accordingly, according to this modified example, it is possible to further prevent the formation of a place where the composition of the liquid crystal 6 is irregular.

Modified Example (No. 6) of Example 3-3

Figure 34A:
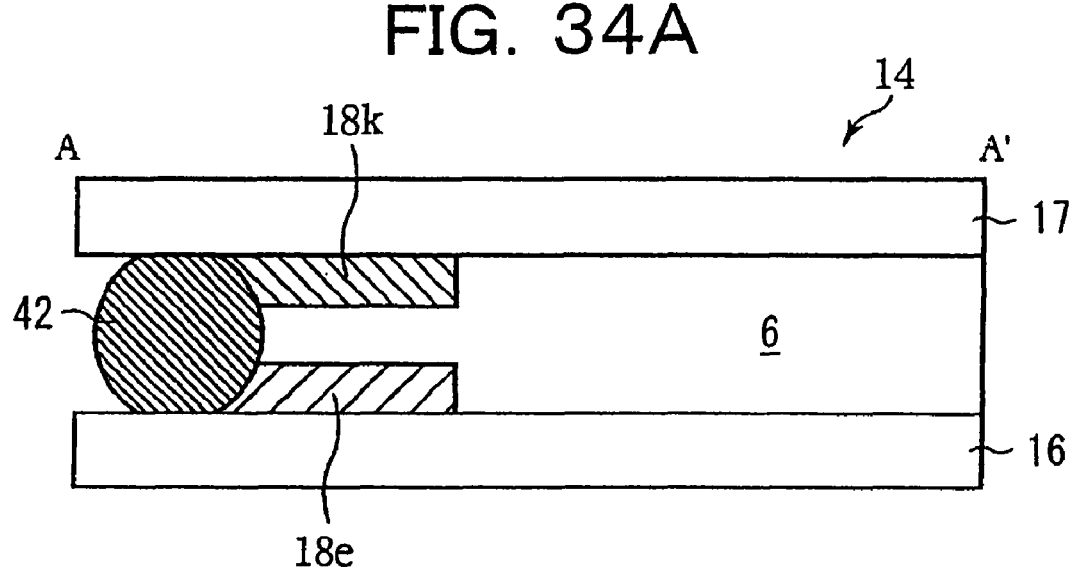
FIGS. 34A to 34C are sectional views showing a liquid crystal display device according to a modified example (No. 6) of the example 3-3 of the third embodiment of the invention.
Figure 34B:
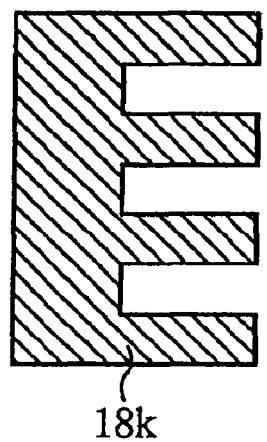
Figure 34C:
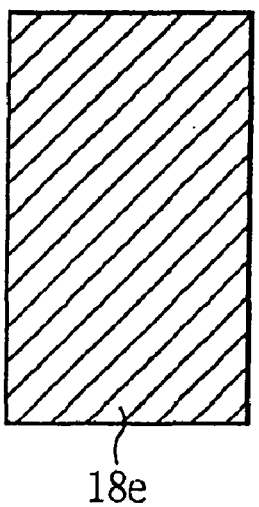

Next, a modified example (No. 6) of the liquid crystal display device according to this example will be described with reference to FIGS. 34A to 34C. FIGS. 34A to 34C are schematic views showing a liquid crystal display device according to this modified example. FIG. 34A is a sectional view showing the liquid crystal display device according to this modified example. FIG. 34B is a plan view (No. 1) showing a pattern of an injection delaying structure. FIG. 34C is a plan view (No. 2) showing a pattern of an injection delaying structure.

The liquid crystal display device according to this modified example has a main feature that the plane shape of an injection delaying structure 18e provided at the side of a substrate 16 is not symmetrical to the plane shape of an injection delaying structure 18k provided at the side of a substrate 17.

As shown in FIGS. 34A to 34C, the injection delaying structure 18e is formed on the substrate 16 and in the vicinity of a seal member 42. The injection delaying structure 18e is formed into a mat shape.

The injection delaying structure 18k is formed on the substrate 17 and in the vicinity of the seal member 42. The injection delaying structure 18k has such a shape that a predetermined pattern is repeated.

As stated above, the plane shape of the injection delaying structure 18e provided at the side of the substrate 16 may not be symmetrical to the plane shape of the injection delaying structure 18k provided at the side of the substrate 17.

Various Modifications

This embodiment can be variously modified in addition to the above examples.

For example, in the above examples, although the description has been given of the case where the principle of this embodiment is applied to the liquid crystal display device of the system in which the pre-tilt angle is given by the polymer structure, the invention is not limited to the liquid crystal display device of the system in which the pre-tilt angle is given by the polymer structure, but can be applied to any liquid crystal display device. However, in the vertical alignment type liquid crystal display device, especially in the liquid crystal display device of the system in which the pre-tilt angle is given by the polymer structure, since there is a tendency that the uneven display is apt to occur, it is especially effective to apply this embodiment.

As described above, according to this embodiment, since the injection delaying structure for slowing the injection speed of the liquid crystal is provided in the vicinity of the seal member, the injection speed of the liquid crystal in the vicinity of the seal member can be made low. Thus, according to this embodiment, it is possible to prevent the occurrence of such a state that the liquid crystal is turned back by the corner part of the liquid crystal cell, and the liquid crystal turned back by the corner part collides against the liquid crystal advancing in the display region. Accordingly, according to this embodiment, it is possible to prevent the formation of a place where the composition of the liquid crystal is irregular, and the liquid crystal display device having a less uneven display can be provided.

Fourth Embodiment

Next, a liquid crystal display device according to a fourth embodiment of the invention will be described.

This embodiment relates to a liquid crystal display device, and particularly to a liquid crystal display device of a vertical alignment type and of a system in which the alignment of a liquid crystal molecule is controlled by using an alignment regulating force of a polymer formed by light polymerization or the like.

As already stated, although the MVA mode liquid crystal display device has excellent visual angle characteristics, since many complicated structures such as projections for regulating alignment or slits are provided in the pixel plane, there is a problem that the aperture ratio is inevitably lowered, and the brightness is inferior. Further, it can not be neglected that the formation itself of the many minute and fine structures complicates the manufacturing process and increases the manufacturing cost.

This embodiment has been made in view of the above problem, and an object is to provide a liquid crystal display device in which an aperture ratio can be improved easily and certainly without causing defects such as disclination in a pixel and which realizes a high luminance and high reliable liquid crystal display.

As a result of an earnest study, the present inventor(s) (have) conceived various modes of this embodiment described below.

A liquid crystal display device of this embodiment is a liquid crystal display device in which a first substrate including a first electrode and a second substrate including a second electrode are bonded through an alignment film and a liquid crystal layer, the liquid crystal layer includes in a liquid crystal a polymer structure for aligning a liquid crystal molecule in a predetermined direction, the first electrode of the first substrate has the shape of comb teeth, a connection part for connecting the respective comb teeth is formed at least at one end part, and the second substrate includes a projection at a part opposite to the connection part.

(Basic Point)

First, the basic point of this embodiment will be described.

As a method of improving an MVA mode liquid crystal display device, improving an aperture ratio to increase brightness, and raising the level in cost as well, the present inventor et al., have developed an alignment regulating technique for obtaining a stable alignment by mixing a monomer capable of being polymerized by light or heat in a liquid crystal and by polymerizing it.

Figure 35:
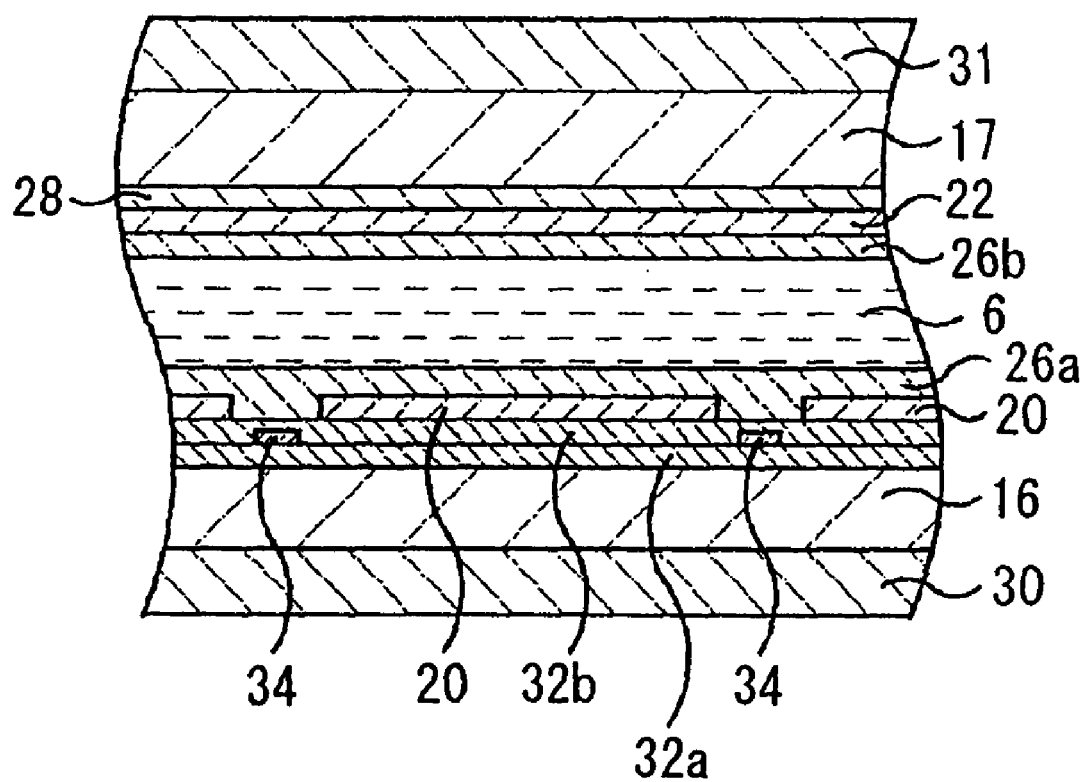
FIG. 35 is a sectional view showing the main construction of a liquid crystal display device.

As shown in FIG. 35, this liquid crystal display device is constituted by a pair of transparent glass substrates 16 and 17 spaced by a predetermined interval and opposite to each other, and a liquid crystal layer 6 sandwiched between the transparent glass substrates 16 and 17. The transparent glass substrates 16 and 17 are bonded and fixed by a not-shown seal member.

Plural pixel electrodes 20 made of ITO and not-shown TFTs as active elements are formed on the one transparent glass substrate (TFT substrate) 16 through homogeneous insulating layers 32a and 32b, and a transparent vertical alignment film 26a is formed so as to cover the pixel electrodes 20. A CF 28, a common electrode 22 and a vertical alignment film 26b are sequentially stacked on the other transparent glass substrate (CF substrate) 12. Then, vertical alignment films 26a and 26b are made to face each other so as to hold the liquid crystal layer 6 therebetween, and the glass substrates 16 and 17 are fixed by a seal member. Polarizers 30 and 31 are provided at the outsides of the respective substrates 16 and 17. The pixel electrodes 20, together with an active matrix (TFT matrix), are formed, and a data bus line 34 to which a drain electrode of a TFT is connected is shown in the illustrated example. Besides, although not shown, a gate bus line to which a gate electrode of the TFT is connected is also formed. Incidentally, the electrodes may be provided on only one substrate.

The liquid crystal layer 6 is formed by injection of a liquid crystal through a liquid crystal injection port. In this embodiment, monomers capable of being polymerized by light or heat are mixed in the liquid crystal. UV irradiation or heat treatment is carried out while a predetermined alternating voltage is applied to the injected liquid crystal, so that the monomers are polymerized and polymer structures regulated by an alignment pattern of comb teeth are formed in the liquid crystal layer 6. Liquid crystal molecules are regulated by the polymer structures and are aligned according to the alignment pattern.

Figure 36A:
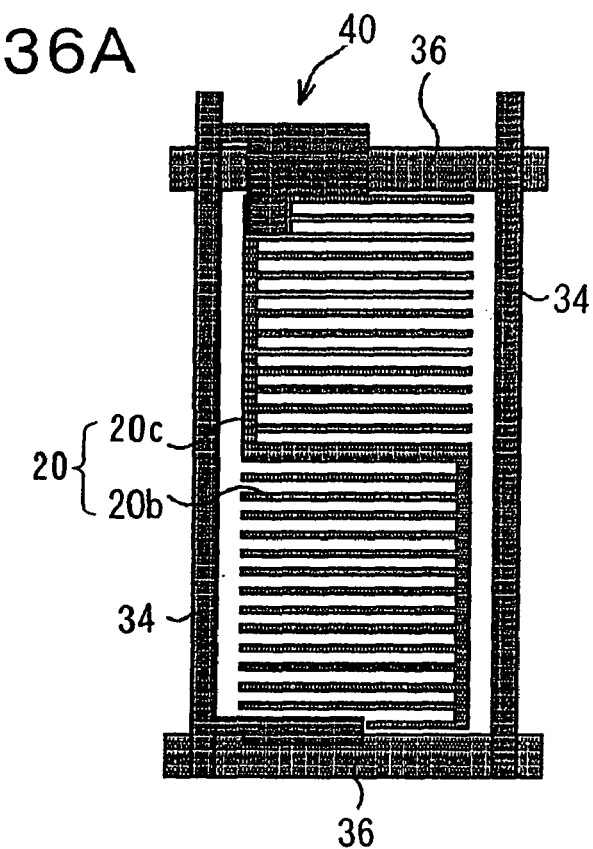
FIGS. 36A and 36B are schematic views showing the main construction of a liquid crystal display device.
Figure 36B:
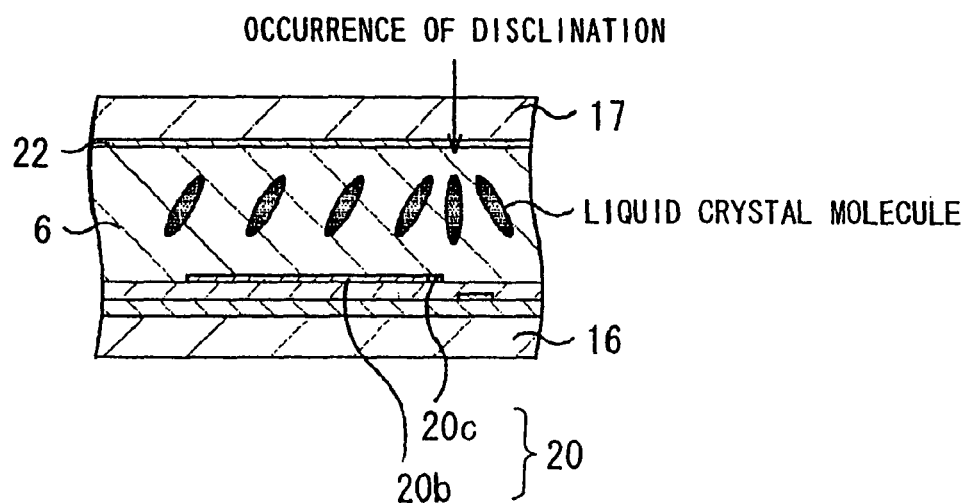

In addition to the above construction, in order to make the alignment control of the liquid crystal molecules fine and to further improve light transmission factor, as shown in FIGS. 36A and 36B (FIG. 36A is a plan view, and FIG. 36B is a sectional view), a construction has been designed such that slits formed in the pixel electrode 20 made of ITO are made simple, and the liquid crystal molecules are inclined in two directions at the time of application of a voltage. Incidentally, in the following FIGS. 36A to 41, with respect to the alignment films 26a and 26b and the like, their illustration is omitted for convenience.

In FIG. 36A, a pixel is formed to be surrounded by a data bus line 34 and a gate bus line 36 orthogonal thereto. The pixel electrode 20 is worked into the shape of minute comb teeth, and is constructed such that a connection part 20c for connecting respective comb teeth 20b is provided. Further, a TFT 40 as an active element is provided at one end of the pixel electrode 20. The connection part 20c extends almost parallel to the data bus line 34, the left ends of the respective comb teeth 20b are connected in the upper part of the pixel electrode 20 in FIG. 36A, and the right ends of the respective comb teeth 20b are connected in the lower part. By this, the liquid crystal molecules are inclined in the two different directions in one pixel.

However, in this case, as shown in FIG. 36B, by the electric field at the connection part 20c of the pixel electrode 20, a regulating force is exerted on liquid crystal molecules positioned above the connection part 20c to incline them in the reverse direction to the liquid crystal molecules positioned above the comb teeth 20b. Thus, a disclination occurs above the connection part 20c, which becomes one of causes to lower the transmission factor.

Figure 37A:
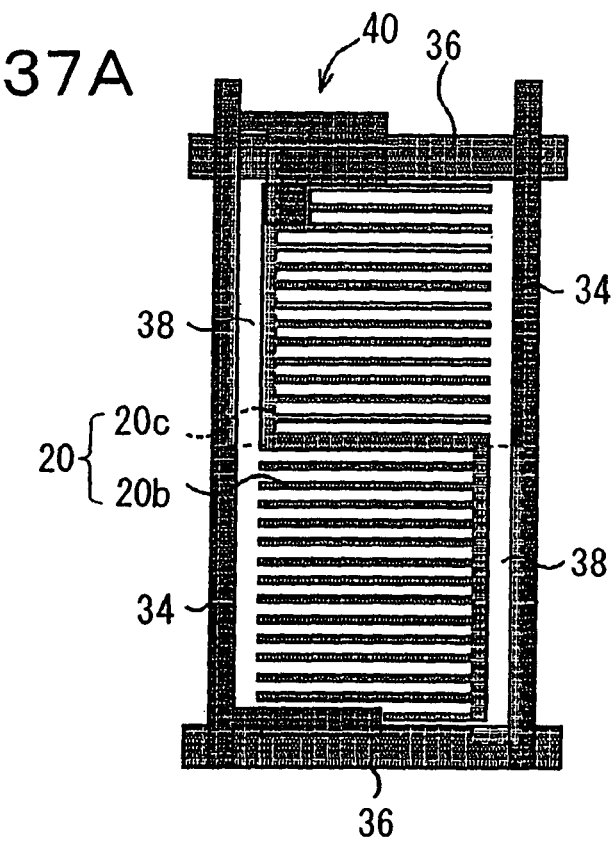
FIGS. 37A and 37B are schematic views showing the main construction of a liquid crystal display device according to a fourth embodiment of the invention.
Figure 37B:
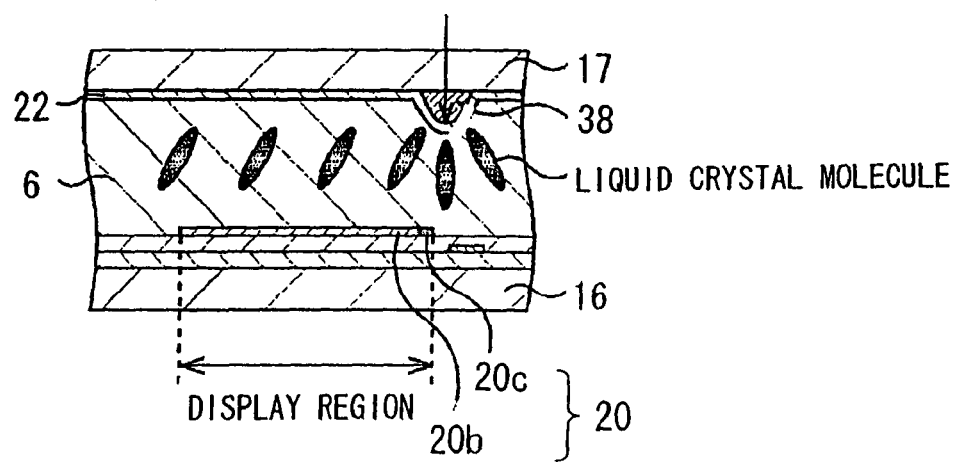

In the liquid crystal display device of the construction shown in FIGS. 36A and 36B, in order to suppress the occurrence of the disclination, the present inventors have conceived providing a bank-like projection 38 at a part of the CF substrate 17 opposite to the connection part 20c in order to correct the alignment of the liquid crystal molecules above the connection part 20c as shown in FIGS. 37A and 37B (FIG. 37A is a plan view, and FIG. 37B is a sectional view).

When the projection 38 is provided on the CF substrate 17 at a portion opposite to the connection part 20c and a region where the data bus line 34 closest to the connection part 20c exists, as shown in FIG. 37B, the liquid crystal molecule which is about to be inclined in the reverse direction to the liquid crystal molecules above the comb teeth 20b is regulated by the projection 38, and is inclined in the same direction as the liquid crystal molecules above the comb teeth 20b. By this, the occurrence of the disclination can be prevented.

Figure 38:
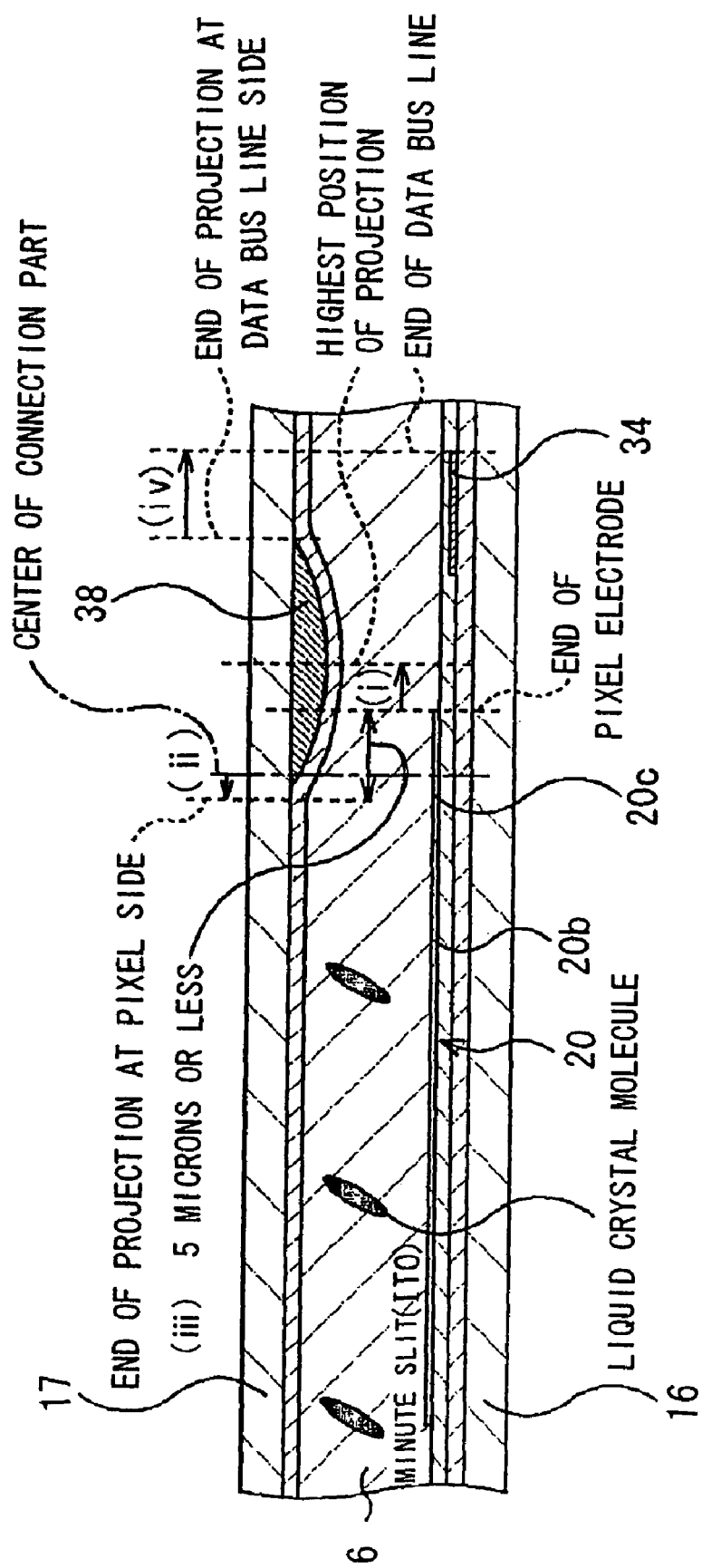
FIG. 38 is a schematic view showing the main construction of the liquid crystal display device according to the fourth embodiment of the invention.
Figure 39:
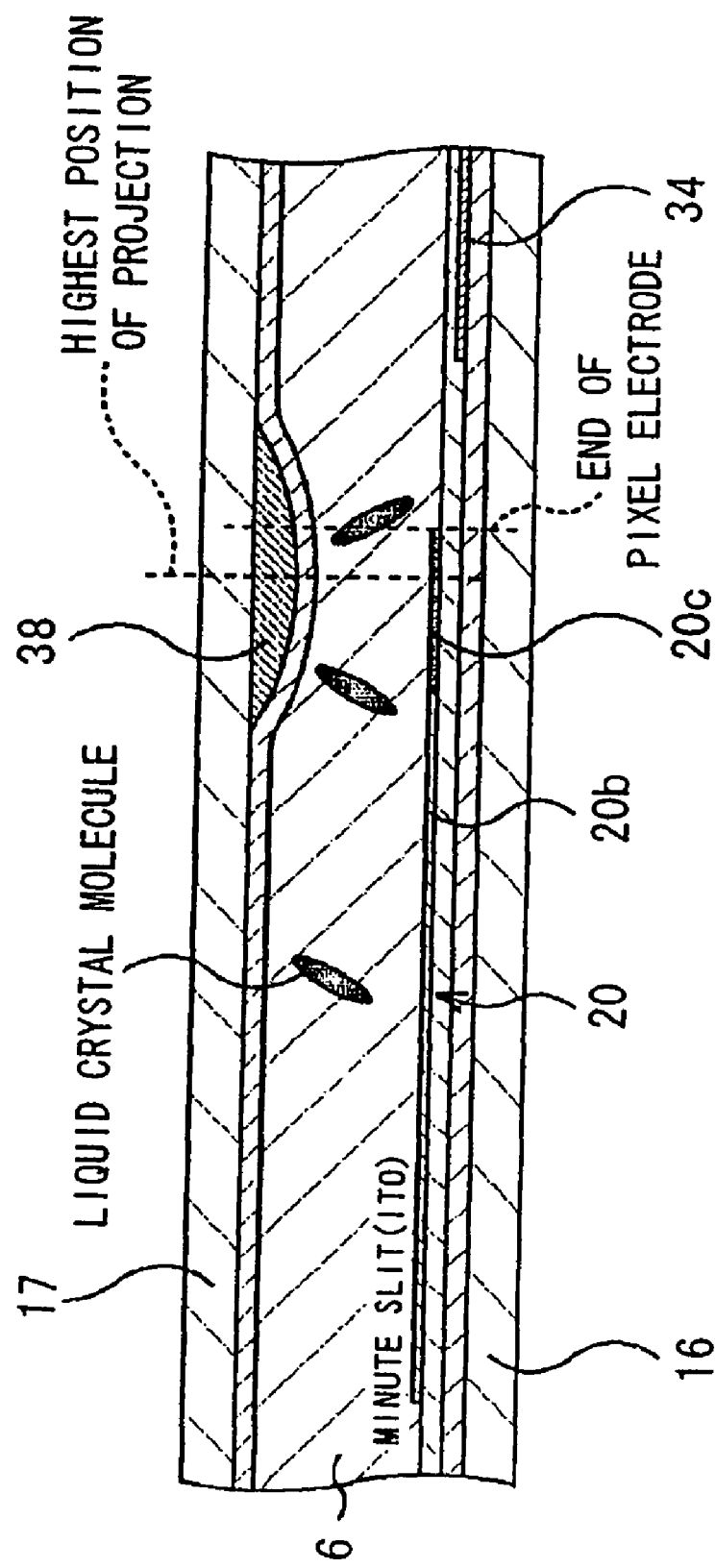
FIG. 39 is a schematic view showing a comparison to the liquid crystal display device according to the fourth embodiment of the invention.
Figure 40:
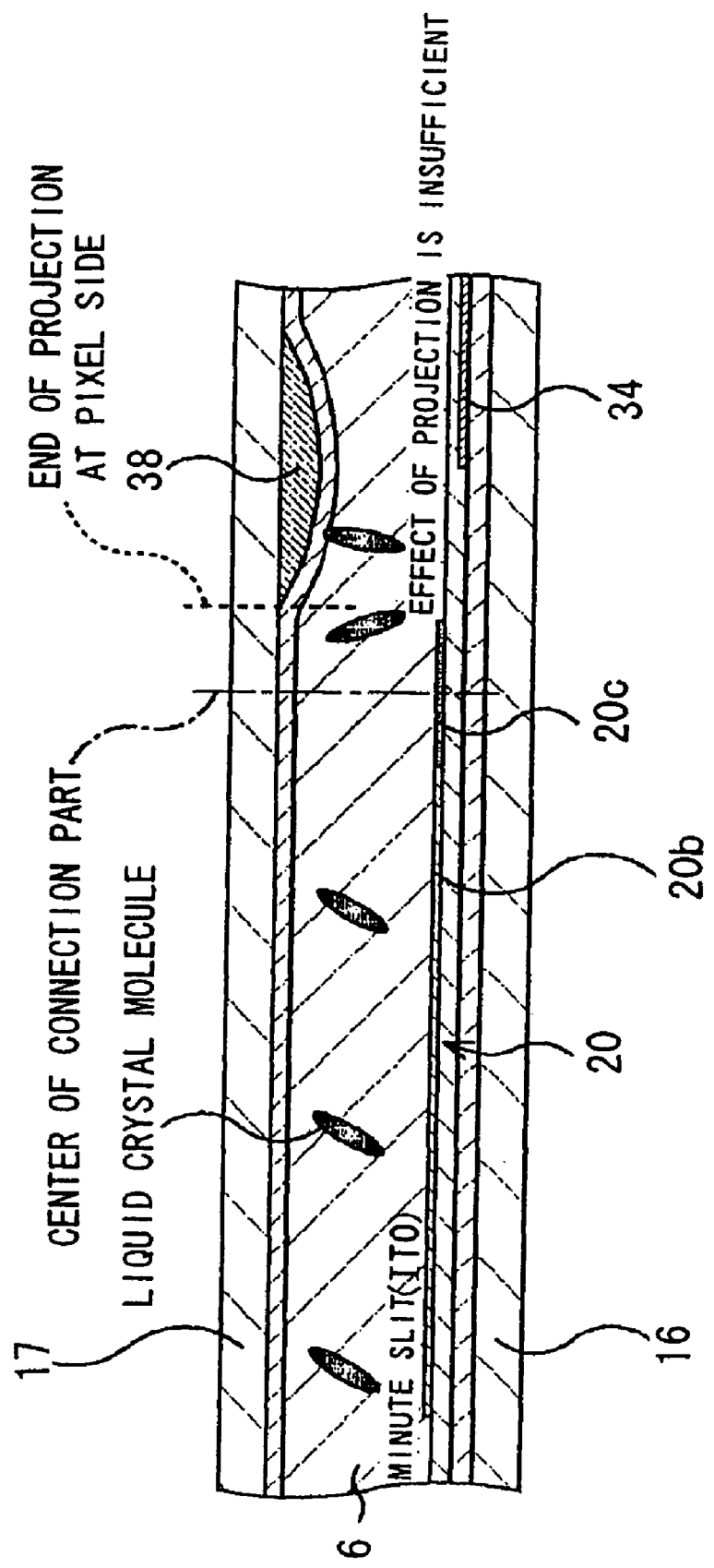
FIG. 40 is a schematic view showing a comparison to the liquid crystal display device according to the fourth embodiment of the invention.
Figure 41:
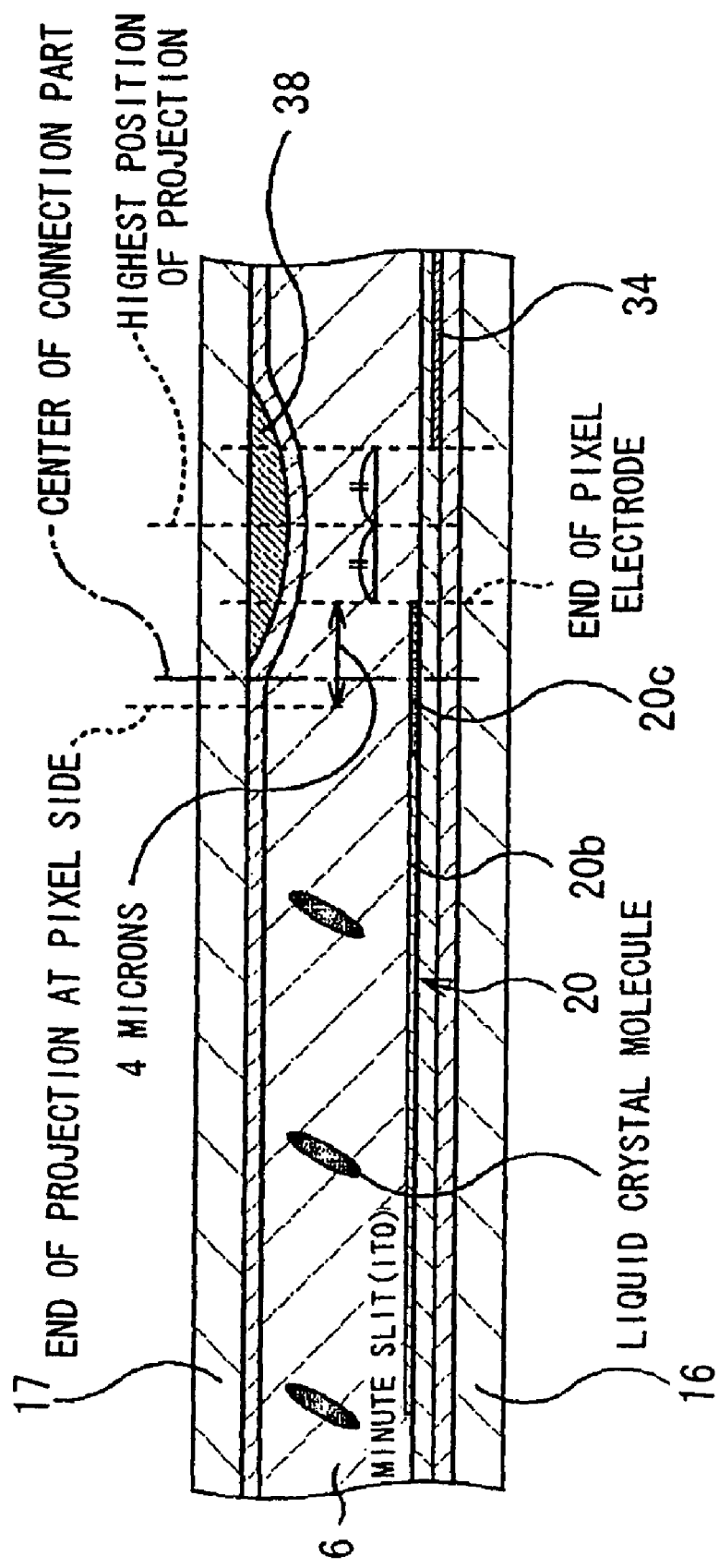
FIG. 41 is a schematic view showing a specific construction of a liquid crystal display device according to example 4-1 of the fourth embodiment of the invention.

In order to effectively use the projection 38, it is desirable that the highest position of the projection 38 is positioned closer to the data bus line 34 than the end of the connection part 20c of the pixel electrode 20 (see (i) of FIG. 38). When the highest position of the projection 38 is positioned inside the end of the connection part 20c, the liquid crystal molecule above the connection part 20c is inclined in the reverse direction to the liquid crystal molecules above the comb teeth 20b by the opposite side oblique surface of the projection 38 (see FIG. 39). By providing the projection 38 as in (i) of FIG. 38, the liquid crystal molecule above the connection part 20c is regulated by the oblique surface of the projection 38 and is certainly inclined in the same direction (forward direction) as the liquid crystal molecules above the comb teeth 20b.

In order to further effectively use the projection 38, it is desirable that the end part of the projection 38 at the side of the pixel electrode 20 is positioned inside the pixel electrode 20 with respect to the center of the connection part 20c (see (ii) of FIG. 38). That is, in the case where the oblique surface to incline the liquid crystal molecule in the forward direction is not positioned in a region wider than a region where the liquid crystal molecule is inclined in the reverse direction by an electric field, the effect lessens (see FIG. 40). By disposing the projection 38 as in (ii) of FIG. 38, a sufficient inclination in the forward direction can be obtained even above the connection part 20c.

However, the transmission factor drops in the region where the projection 38 exists. According to the investigation of the present inventor et al., it has been found that when the width of the portion of the projection 38 falling within the pixel region is 5 μm or less, the transmission factor of the liquid crystal display device in the case where the projection 38 is provided is higher than that in the case where it is not provided (see (iii) of FIG. 38).

Besides, it has been found that in order to prevent a bad influence on an adjacent pixel, it is desirable that the end part of the projection 38 at the side of the data bus line 34 is inside the outside (adjacent pixel side) end part of the data bus line 34 (see (iv) of FIG. 38).

Further, when the width of each of the comb teeth 20b is too narrow, there is a fear that they are broken, and on the other hand, when it is too wide, the liquid crystal molecules are not inclined in the direction parallel to the comb teeth 20b. Besides, when a distance between the comb teeth 20b is too narrow, there is a fear that a short circuit is caused between the adjacent comb teeth 20b, and on the other hand, when it is too wide, the liquid crystal molecules are not inclined in the direction parallel to the slit. Then, it is preferable that the distance between the comb teeth 20b and the width of each of the comb teeth 20b are set to be from 0.5 μm to 5 μm. Similarly, it is preferable that a cut place between a connection portion of the TFT 40 and a connection portion of the minute ITO is also set to be from 0.5 μm to 5 μm.

Example 4-1

Based on the foregoing basic point of this embodiment, specific example 4-1 will be described. Here, a liquid crystal display device shown in FIG. 41 was fabricated.

In this example, vertical alignment films are used as the alignment films 26a and 26b, and a liquid crystal having a negative dielectric anisotropy is used. Two polarizing plates bonded to both sides of a liquid crystal panel are disposed in crossed Nicols. The liquid crystal display device according to this example has a normally black mode. The polarizing axis of the polarizing plate is inclined by 45° with respect to the data bus line 34, the panel size is 15 inches in diagonal, and the resolution is XGA.

In this liquid crystal display device, the width of the projection 38 is 10 μm, and the highest part (apex part) of the projection 38 is positioned at the center of a region sandwiched between the end part of the pixel electrode 20 and the end part of the data bus line 34. Further, the end part of the projection 38 at the side of the pixel electrode 20 is positioned inside the pixel electrode 20 with respect to the center of the connection part 20c. Here, the width of a portion of the projection 38 within the pixel region was 4 μm. This liquid crystal display device is made a sample A.

Sample B and C were fabricated for comparison with the sample A.

The sample B is a liquid crystal display device having such a construction that the width of the projection 38 is 10 μm, the apex part of the projection 38 is positioned 2 μm inside the end part of the pixel electrode 20, and the width of a portion of the projection 38 within the pixel region is 7 μm. On the other hand, the sample C is a liquid crystal display device having such a construction that the apex part of the projection 38 is positioned outside the end part of the pixel electrode 20, and the width of a portion of the projection 38 within the pixel region is 5 μm.

In addition to the samples B and C, the liquid crystal display device of the construction of FIG. 36A was made sample D, and when the luminance was compared between the sample D and the samples A, B and C, the luminance in the sample A was improved by 5% as compared with the sample D, the luminance in the sample B was lowered by 1% as compared with the sample D, and the sample C exhibited the luminance comparable to the sample D. As stated above, explicit superiority of the sample A of this example was verified.

As described above, according to the liquid crystal display device of this embodiment, it becomes possible to easily and certainly improve the aperture ratio without causing defects such as disclination in a pixel and to realize the liquid crystal display device having high luminance and high reliability.

The invention is not limited to the above embodiment, but can be modified variously.

For example, in the above embodiment, although the liquid crystal display device of the normally black mode is cited as an example, the invention is not limited to this, but can be applied to a liquid crystal display device of a normally white mode.

Besides, in the above embodiment, although the transmission liquid crystal display device is cited as an example, the invention is not limited to this, but can be applied to another liquid crystal display device such as a reflection or transflective liquid crystal display device.

Besides, in the first, second and fourth embodiments, although the description has been given of the example in which the monomer is cited as an example of the polymerizable component, an oligomer may be naturally made to be contained as the polymerizable component in the liquid crystal layer.

As described above, according to the invention, it is possible to realize the liquid crystal display device in which excellent display characteristics can be obtained.

Besides, according to the invention, the aperture ratio can be easily and certainly improved without causing defects such as an uneven display, and the liquid crystal display device having high reliability can be realized.

Further, according to the invention, since the injection delaying structure for slowing the injection speed of the liquid crystal is provided in the vicinity of the seal member, the injection speed of the liquid crystal in the vicinity of the seal member can be made low. Thus, according to the invention, it is possible to prevent the occurrence of such a state that the liquid crystal is turned back by the corner part of the liquid crystal cell, and the liquid crystal turned back by the corner part collides against the liquid crystal advancing in the display region. Therefore, according to the invention, it is possible to prevent the formation of a place where the composition of the liquid crystal is irregular, and further, the liquid crystal display device having a less uneven display can be provided.

What is claimed is:

1. A liquid crystal display device comprising:
   a first substrate including a first electrode; and
   a second substrate including a second electrode bonded with the first substrate through an alignment film and a liquid crystal layer;
   wherein the liquid crystal layer includes in a liquid crystal a polymer structure for alignment of a liquid crystal molecule in a predetermined direction;
   the first electrode of the first substrate has a shape of comb teeth, a connection part for connecting the respective comb teeth being formed at least at one end part; and
   the second substrate includes a projection at a part opposite to the connection part.

2. A liquid crystal display device according to claim 1, wherein the first substrate includes a data bus line in a vicinity of the connection part.

3. A liquid crystal display device according to claim 1, wherein the projection is formed so that a part of the first substrate opposite to an apex of the projection is positioned outside the connection part.

4. A liquid crystal display device according to claim 3, wherein the projection is formed so that a part of the first substrate opposite to an end part of the projection at a side of the first electrode is positioned at an inside of a pixel side with respect to a center of the connection part.

5. A liquid crystal display device according to claim 1, wherein the projection is formed so that a distance between a part of the first substrate opposite to an end part of the projection at a side of the first electrode and an outside end part of the connection part is 5 μm or less.

6. A liquid crystal display device according to claim 1, wherein the projection is formed so that a part of the first substrate opposite to an end part of the projection at a side of the data bus line is positioned inside an outside end part of the data bus line.

7. A liquid crystal display device according to claim 1, wherein a distance between the comb teeth in the first electrode is 0.5 μm to 5 μm.

* * * * *